United States Patent
Bolea et al.

(10) Patent No.: US 10,614,286 B2
(45) Date of Patent: Apr. 7, 2020

(54) METHOD OF DETECTING GAS-PRODUCING MICROBIAL COLONIES

(71) Applicant: 3M INNOVATIVE PROPERTIES COMPANY, St. Paul, MN (US)

(72) Inventors: Phillip A. Bolea, Grant, MN (US); Michael G. Williams, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 185 days.

(21) Appl. No.: 15/882,222

(22) Filed: Jan. 29, 2018

(65) Prior Publication Data

US 2018/0150680 A1    May 31, 2018

Related U.S. Application Data

(63) Continuation of application No. 15/593,583, filed on May 12, 2017, now Pat. No. 9,916,491, which is a
(Continued)

(51) Int. Cl.
*G06K 9/00* (2006.01)
*G06T 7/149* (2017.01)
(Continued)

(52) U.S. Cl.
CPC ....... *G06K 9/00147* (2013.01); *G06K 9/0014* (2013.01); *G06K 9/00134* (2013.01);
(Continued)

(58) Field of Classification Search
None
See application file for complete search history.

(56) References Cited

U.S. PATENT DOCUMENTS

| 4,565,783 A | 1/1986 | Hansen et al. |
| 5,089,413 A | 2/1992 | Nelson et al. |

(Continued)

FOREIGN PATENT DOCUMENTS

| WO | WO 1996/18167 | 6/1996 |
| WO | WO 1996/18720 | 6/1996 |

(Continued)

OTHER PUBLICATIONS

US 4,476,226 A, 10/1984, Hansen et al. (withdrawn)
(Continued)

*Primary Examiner* — Shervin K Nakhjavan
(74) *Attorney, Agent, or Firm* — Eric E. Silverman

(57) ABSTRACT

A first method comprises using an imaging device to produce a plurality of images of a culture device, analyzing a first image to identify a microorganism colony at a first location, analyzing a second image to identify a gas bubble at a second location, and determining whether the first location is proximate the second location. A second method comprises analyzing an image of a culture device to detect gas bubbles and classifying the gas bubbles according to a size parameter associated with each of the gas bubbles. A third method comprises analyzing a first area of an image of a culture device to detect a first number of gas bubbles, analyzing a second area of the image to detect a second number of gas bubbles, and comparing the first number of gas bubbles to the second number of gas bubbles.

15 Claims, 9 Drawing Sheets

Related U.S. Application Data continuation of application No. 14/652,379, filed as application No. PCT/US2013/074887 on Dec. 13, 2013, now Pat. No. 9,684,816.

(60) Provisional application No. 61/739,789, filed on Dec. 20, 2012.

(51) Int. Cl.
*G06T 7/62* (2017.01)
*G06T 7/70* (2017.01)

(52) U.S. Cl.
CPC ............... *G06T 7/149* (2017.01); *G06T 7/62* (2017.01); *G06T 7/70* (2017.01); *G06T 2207/10016* (2013.01); *G06T 2207/10056* (2013.01); *G06T 2207/10152* (2013.01); *G06T 2207/20124* (2013.01); *G06T 2207/30242* (2013.01)

(56) References Cited

U.S. PATENT DOCUMENTS

| | | | |
|---|---|---|---|
| 5,364,766 A * | 11/1994 | MacH | C12N 1/20 422/552 |
| 5,510,246 A | 4/1996 | Morgan | |
| 5,601,998 A | 2/1997 | Mach et al. | |
| 5,681,712 A | 10/1997 | Nelson | |
| 5,723,308 A | 3/1998 | Mach et al. | |
| 6,058,209 A | 5/2000 | Vaidyanathan et al. | |
| 6,243,486 B1 | 6/2001 | Weiss | |
| 6,251,624 B1 | 6/2001 | Matsumura et al. | |
| 6,381,353 B1 | 4/2002 | Weiss | |
| 7,298,885 B2 | 11/2007 | Green et al. | |
| 7,298,886 B2 * | 11/2007 | Plumb | G06K 9/00127 382/133 |
| 7,496,225 B2 | 2/2009 | Graessle et al. | |
| 7,901,933 B2 * | 3/2011 | Green | G06K 9/00127 435/287.9 |
| 8,094,916 B2 * | 1/2012 | Graessle | G01N 15/1475 382/133 |
| 2004/0092001 A1 | 5/2004 | Bedingham et al. | |
| 2004/0253660 A1 | 12/2004 | Gibbs et al. | |
| 2005/0053266 A1 | 3/2005 | Plumb et al. | |
| 2005/0208539 A1 | 9/2005 | Vann et al. | |
| 2008/0213453 A1 | 9/2008 | Burmester et al. | |
| 2011/0102582 A1 | 5/2011 | Graessle et al. | |
| 2011/0143334 A1 | 6/2011 | Roscoe et al. | |
| 2011/0206263 A1 | 8/2011 | Plumb et al. | |
| 2011/0269179 A1 | 11/2011 | Kshirsagar | |
| 2012/0094327 A1 | 4/2012 | Young et al. | |
| 2013/0258092 A1 | 10/2013 | Hallset | |
| 2015/0339510 A1 * | 11/2015 | Bolea | G06K 9/00134 382/133 |

FOREIGN PATENT DOCUMENTS

| | | |
|---|---|---|
| WO | WO 1998/59314 | 12/1998 |
| WO | WO 2005/062744 | 7/2005 |
| WO | WO 2009/082667 | 7/2009 |
| WO | WO 2012/012104 | 1/2012 |
| WO | WO 2014/099643 | 6/2014 |

OTHER PUBLICATIONS

Marotz, J. et al.; "Effective object recognition for automated counting of colonies in Petri dishes (automated colony counting)₁ "; Computer Methods and Programs in Biomedicine; vol. 66; 2001; pp. 183-198 (XP009160165).

Brochure entitled "Interpretation Guide—3M Petrifilm ™" retrieved from internet Feb. 14, 2014; 2008; XP055102418; 78 pgs.

* cited by examiner

METHOD OF DETECTING GAS-PRODUCING MICROBIAL COLONIES

CROSS REFERENCE TO RELATED APPLICATIONS

This application is a continuation of U.S. patent application Ser. No. 15/593,583, filed May 12, 2017, which is a continuation of U.S. patent application Ser. No. 14/652,379, filed Jun. 15, 2015, now U.S. Pat. No. 9,684,816, which is a national stage filing under 35 U.S.C. 371 of PCT/US2013/074887, filed Dec. 13, 2013, which claims the benefit of U.S. Provisional Patent Application No. 61/739,789, filed Dec. 20, 2012, the disclosures of which are incorporated by reference in their entirety herein.

BACKGROUND

Biological safety is a paramount concern in modern society. Testing for biological contamination in foods or other materials has become an important and often mandatory requirement for developers and distributors of food products. Biological testing is also used to identify bacteria or other agents in laboratory samples such as blood samples taken from medical patients, laboratory samples developed for experimental purposes, and other types of biological samples. Various techniques and devices can be utilized to improve biological testing and to streamline and standardize the biological testing process.

A wide variety of culture devices have been developed. As one example, culture devices have been developed by 3M Company (hereafter "3M") of St. Paul, Minn. In particular, culture devices are sold by 3M under the trade name PETRIFILM plates. Culture devices can be utilized to facilitate the rapid growth and detection of microorganisms commonly associated with food contamination, including, for example, aerobic bacteria, *E. coli*, coliform, enterobacteria, yeast, mold, *Staphylococcus aureus*, Listeria, Campylobacter, and the like. The use of PETRIFILM plates, or other growth media, can simplify bacterial testing of food samples.

Culture devices can be used to enumerate or identify the presence of bacteria so that corrective measures can be performed (in the case of food testing) or proper diagnosis can be made (in the case of medical use). In other applications, culture devices may be used to rapidly grow microorganisms in laboratory samples, e.g., for experimental purposes.

Biological scanning units refer to devices used to scan and/or count microbial colonies. For example, a food sample or laboratory sample can be placed on a culture device, and then the plate can be inserted into an incubation chamber. After incubation, the culture device can be placed into the biological scanning unit for automated detection and enumeration of bacterial growth. In this manner, biological scanning units automate the detection and enumeration of microbial colonies in a culture device, and thereby improve the biological testing process by reducing human error.

SUMMARY

In general, the present disclosure is directed to a technique for distinguishing objects in a scanned image. In particular, the technique is used to identify a gas-producing microorganism colony that is present in an image of a culture device, the culture device comprising a culture medium disposed without a headspace between two substrates. In addition, the technique further may be used to count the number of gas-producing microbial colonies in the scanned image of the culture device. To count the colonies, a culture device containing the culture medium is inserted into a scanning unit. Upon insertion of the culture device, the scanning unit generates an image of the culture device. Then, the number of gas-producing microorganism colonies can be counted or otherwise determined using image processing and analysis routines performed either within the scanning unit or by an external computing device, such as a desktop computer, workstation or the like. In accordance with the invention, a method of distinguishing a gas-producing colony is described. The method can be used to improve the accuracy over existing methods of automated counts of microorganism colonies in a scanned image.

In one aspect, the present disclosure provides a method. The method can comprise using an imaging device to produce a first image of a thin film culture device, the culture device having a front side having a transparent film cover sheet and a back side having a translucent substrate. The first image is produced while providing illumination to the front side of the device. The culture device comprises an indicator compound that is converted by a microorganism to a first product that is observable by a first color. The culture device comprises a nutrient that can be converted to by a first type of microorganism to a gas. The method further can comprise using the imaging device to produce a second image of the thin film culture device, wherein the second image is produced while providing illumination to the back side of the device; analyzing the first image to identify a microorganism colony at a first location in the culture device; analyzing the second image to identify a first gas bubble at a second location in the culture device; and determining whether the first location is within a predetermined distance from the second location.

In any embodiment, the first image can be produced while illuminating the device with a first ratio of front-side illumination to back-side illumination, wherein the second image can be produced while illuminating the device with a second ratio of front-side illumination to back-side illumination that is lower than the first ratio. In any of the above embodiments, the first gas bubble can comprise a first perimeter, wherein analyzing the second image to identify a gas bubble can comprise identifying a dark annulus associated with the first perimeter. In any of the above embodiments, analyzing the second image to identify a first gas bubble can comprise calculating a size parameter of the first gas bubble. In any of the above embodiments, the method further can comprise comparing the size parameter of the first gas bubble to the size parameter of a second gas bubble. In any of the above embodiments, the method further can comprise using the first image to count a number of microorganism colonies in the culture device. In any of the above embodiments, the method further can comprise using the first and second images to count a number of microorganism colonies that don't convert the nutrient to a gas.

In another aspect, the present disclosure provides a computer readable medium comprising computer readable instructions. The computer readable instructions, when executed by a processor, can cause an image-analyzing system comprising the processor to analyze a first image of a thin film culture device, the culture device having a front side and a back side opposite the front side. The first image is produced while providing illumination to the front side of the device. Analyzing the first image comprises identifying a microorganism colony at a first location in the culture device. The computer readable instructions, when executed by a processor, further can cause the processor to analyze a second image of the thin film culture device, wherein the second image is produced while providing illumination to the back side of the device. Analyzing the second image comprises identifying a gas bubble at a second location in the culture device. The computer readable instructions, when executed by a processor, further can cause the processor to determine whether the first location is within a predetermined distance from the second location.

In any of the above embodiments of the computer readable medium, analyzing the second image to identify a second location of a gas bubble can comprise identifying a dark annulus surrounding the gas bubble. In any of the above embodiments, the computer readable medium further comprise instructions that, when executed in the processor, can cause the system to use the first image to count a number of microorganism colonies in the culture device. In any of the above embodiments, the computer readable medium further comprise instructions that, when executed in the processor, can cause the system to use the first and second images to count a number of gas-producing microorganism colonies in the culture device.

In yet another aspect, the present disclosure provides a method. The method can comprise analyzing an image of the growth area of a thin film culture device to detect gas bubbles and classifying a plurality of the gas bubbles, wherein classifying the plurality of gas bubbles comprises assigning each gas bubble to a first group or a second group according to a size parameter associated with each of the plurality of gas bubbles. In any embodiment, classifying the gas bubbles into a first group and a second group can comprise classifying a first subset of gas bubbles into a first suspect abiogenic bubble group and the method further can comprise assigning a size parameter value upper limit for the first suspect abiogenic bubble group. In any embodiment, classifying the gas bubbles into a first group and a second group can comprise classifying a second subset of gas bubbles into a suspect biogenic bubble group and the method further can comprise assigning a size parameter value lower limit for the suspect biogenic bubble group.

In yet another aspect, the present disclosure provides a computer readable medium. The computer readable medium comprises computer readable instructions that, when executed by a processor can cause an image-analyzing system comprising the processor to analyze an image of the growth area of a thin film culture device to detect gas bubbles and to classify a plurality of the gas bubbles, wherein classifying the plurality of gas bubbles comprises assigning each gas bubble to a first group or a second group according to a size parameter associated with each of the plurality of gas bubbles. In any embodiment, classifying the gas bubbles into a first group and a second group can comprise classifying a first subset of gas bubbles into a first suspect abiogenic bubble group and the computer readable instructions further can cause the processor to assign a size parameter value upper limit for the first suspect abiogenic bubble group. In any embodiment, classifying the gas bubbles into a first group and a second group can comprise classifying a second subset of gas bubbles into a suspect biogenic bubble group and the computer readable instructions further can cause the processor to assign a size parameter value lower limit for the suspect biogenic bubble group.

In yet another aspect, the present disclosure provides a method. The method can comprise analyzing a first area of an image of a growth area of a thin film culture device to detect a first number of gas bubbles in the first area, analyzing a second area of the image to detect a second number of gas bubbles in the second area, and comparing the first number of gas bubbles to the second number of gas bubbles. In any embodiment, the method further can comprise analyzing a third area of the image to detect a third number of gas bubbles in the third area and comparing the first number of gas bubbles or second number of gas bubbles to the third number of gas bubbles. In any embodiment, the method further can comprise analyzing the image to detect gas bubbles in the growth area of the culture device and classifying a plurality of the gas bubbles, wherein classifying the plurality of gas bubbles comprises assigning each gas bubble to a first group or a second group according to a size parameter associated with each of the plurality of gas bubbles. In some embodiment, the method further can comprise determining whether a gas bubble in any of the first, second, or third areas is assigned to the first group or the second group.

In yet another aspect, the present disclosure provides a computer readable medium. The computer readable medium comprises computer readable instructions that, when executed by a processor can cause an image-analyzing system comprising the processor to analyze a first area of an image of a growth area of a thin film culture device to detect a first number of gas bubbles in the first area, analyze a second area of the image to detect a second number of gas bubbles in the second area, and compare the first number of gas bubbles to the second number of gas bubbles. In any embodiment, the computer readable instructions further can cause the processor to analyze a third area of the image to detect a third number of gas bubbles in the third area and to compare the first number of gas bubbles or second number of gas bubbles to the third number of gas bubbles. In any embodiment, the computer readable instructions further can cause the processor to analyze the image to detect gas bubbles in the growth area of the culture device and to classify a plurality of the gas bubbles, wherein classifying the plurality of gas bubbles comprises assigning each gas bubble to a first group or a second group according to a size parameter associated with each of the plurality of gas bubbles. In any embodiment, the computer readable instructions further can cause the processor to determine whether a gas bubble in any of the first, second, or third areas is assigned to the first group or the second group.

Various aspects of the invention may provide a number of advantages. For example, the invention may improve the accuracy of automated counts of microbial colonies on a culture device. In particular, the counting rule described herein may address problems that commonly occur, and which can otherwise undermine the accuracy of automated counting of microbial colonies in culture device.

Additional details of these and other embodiments are set forth in the accompanying drawings and the description below. Other features, objects and advantages will become apparent from the description and drawings, and from the claims.

DETAILED DESCRIPTION

Figure 1:
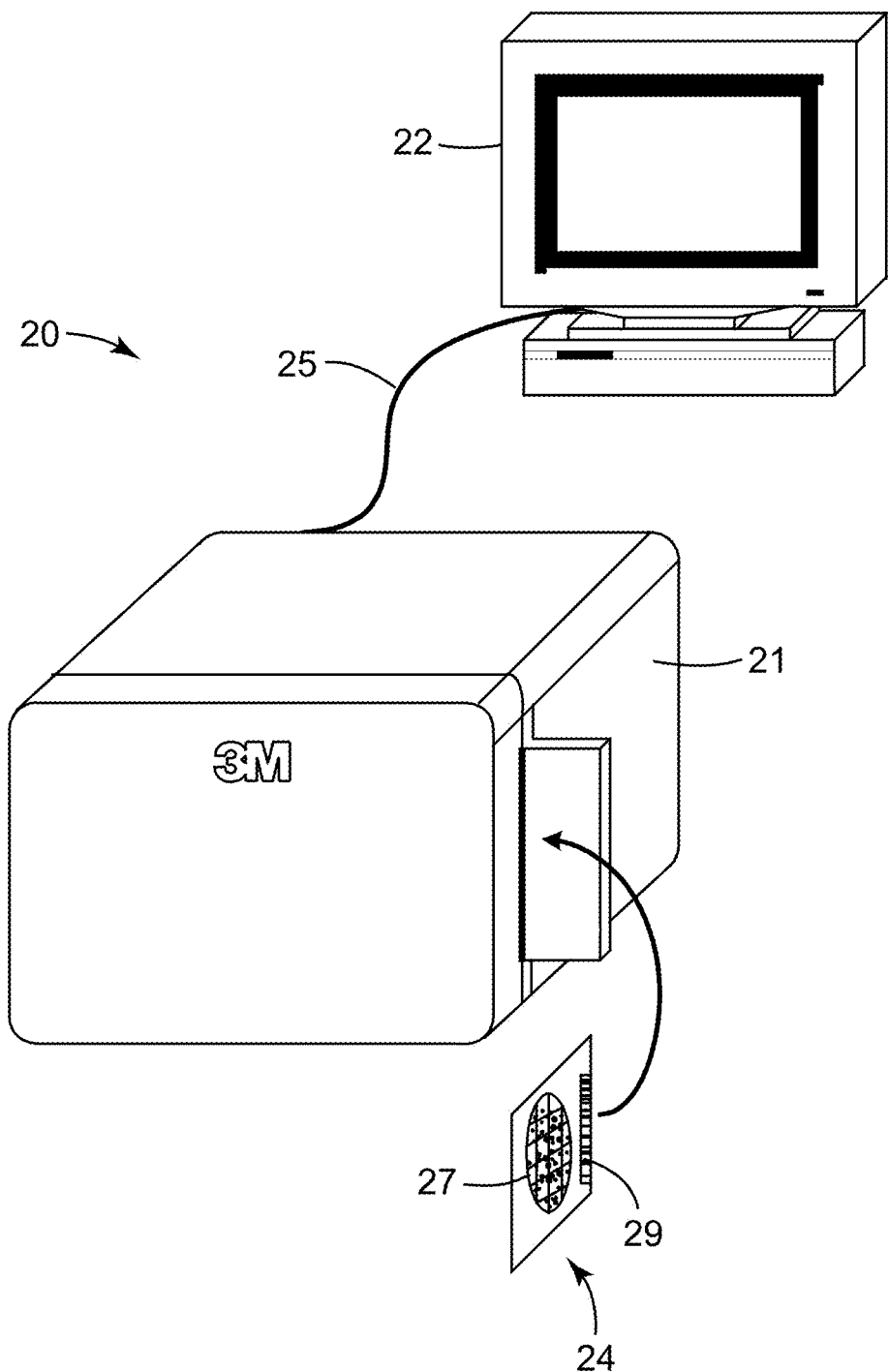
FIG. 1 is a perspective view of an exemplary system comprising a scanning device coupled to an external computer which performs imaging analysis of the images generated by the scanning device.

Detection and counting of microorganisms is a universal problem in many diverse fields. Microorganisms occur in almost all foods, in water, in air, and on numerous surfaces and substances with which humans come in contact. Such microorganisms are often harmful and therefore must be measured and controlled.

A widely used practice for detecting the presence of microorganisms in a substance (e.g., food, water, environmental residue) is to place a sample of the substance to be tested, suitably prepared, in a culture device, and to allow the microorganisms to grow into colonies. When cultured in such a medium, colonies become visible to the eye and can be counted. Each visible colony corresponds to one original microorganism. A method of the present disclosure is performed using such culture devices for growing and counting microbial colonies. The culture device includes an aqueous nutrient medium distributed in a matrix (e.g., a gelling agent such as agar, guar gum, or pectin, for example) to maintain separation of individual colonies. Many culture devices further include indicator compounds as discussed herein. Suitable culture devices for growing and detecting gas-producing microbial colonies according to the present disclosure include culture devices that comprise a culture medium disposed between two substrates. That is, the culture medium is sandwiched between two substrates without a headspace between the culture medium and either of the two substrates.

Suitable culture devices for use in the method of the present disclosure include, for example, thin film culture devices sold by 3M Company under the PETRIFILM trade name. PETRIFILM thin film culture devices are disclosed in numerous publications including, for example, U.S. Pat. Nos. 5,364,766; 5,601,998; and 5,681,712; which are all incorporated herein by reference in their entirety.

Many culture media, including typical agar culture media and culture media used in PETRIFILM plates, include indicator compounds to indicate the presence of a microorganism. Indicator compounds include, for example, pH indicators, chromogenic enzyme substrates, and redox indicators. The indicator compounds, when converted directly or indirectly to a product, typically impart a color change to the microbial colony and/or the culture medium surrounding the colony. The color change often makes it easier to detect the presence of the microbial colony in the culture medium (e.g., it improves the color contrast between the colony and the culture medium) and may the color change also may serve to differentiate a particular colony that reacts with a particular indicator compound from another microbial colony that does not react with that indicator compound.

Many types of culture media for growing and differentiating microorganisms include two or more indicator compounds. For example, the culture medium in a PETRIFILM *E. coli* Count Plate, when hydrated with an aqueous buffer and/or sample, contains a redox indicator (triphenyltetrazolium chloride, hereinafter "TTC") and a chromogenic enzyme substrate (5-bromo-4-chloro-3-indolyl-β-D-glucuronide, hereinafter "X-gluc"). The TTC reacts with microbial cells to form a reddish-colored formazan that stains the cell mass of any bacterial colony that grows in the Gram-negative selective growth medium. In contrast, the X-gluc reacts only with bacteria that, in addition to being able to grow in the selective growth medium, possess β-D-glucuronidase enzyme activity (e.g., *E. coli* strains that possess β-D-glucuronidase enzyme activity). Hydrolysis of X-gluc causes the formation of an indigo dye, which stains the cell mass of the colony blue and forms a less intensely-blue halo surrounding the colony having β-D-glucuronidase enzyme activity.

It is contemplated that the method of the present disclosure can be used to distinguish microbial colonies on the basis of their reaction with one or more of a plurality of indicator compounds and by their respective gas production or lack thereof. The microbial colony can react with one or more indicator compounds to produce a colored or fluorescent product that indicates the presence of the microbes. In addition, the presence of a gas bubble associated with a microbial colony indicates the colony belongs to a group of microorganisms capable of metabolizing a nutrient present in the culture device to a gaseous end product (e.g., carbon dioxide).

Thus, a culture device used in a method according to the present disclosure comprises an effective amount of a nutrient that can be converted (e.g., by fermentation) to a gaseous end product (e.g., carbon dioxide). The culture device also has a unique structure (i.e., a hydrated gel sandwiched between two substantially planar layers) such that a gas bubble produced by microbial activity is trapped in the culture device substantially displaces a portion of the hydrated gel, thereby forming an optically-detectable void space between the planar layers. In any embodiment, the nutrient can be a carbohydrate such as glucose, sucrose, lactose, or a combination of any two or more of the foregoing carbohydrates, for example. A person having ordinary skill in the art will recognize a variety of nutrients that are converted by microbial activity to a gaseous end product and that can be used in a culture medium to identify gas-producing colonies according to the present disclosure.

A culture medium used in a method of the present disclosure can be selected so that it favors the growth of one type of microorganism over other types of microorganisms. For example, the culture medium may include selective ingredients (e.g., antibiotics, sodium chloride, bile salts, dyes such as crystal violet, for example) that inhibit the growth of certain microorganisms (e.g., Gram-negative bacteria) and/or favor the growth of other microorganisms. A person having ordinary skill in the art will recognize a variety of selective agents that can be used to facilitate the growth of certain microorganisms in a culture device used according to a method of the present disclosure.

According to the method of the present disclosure, the sample is prepared, inoculated into the culture device, and incubated according to procedures that are well known in the art. Sample preparation may optionally include dilution, enzymatic digestion, filtration, and/or sedimentation to reduce or remove nonmicrobial debris from the sample prior to introducing the sample into (e.g., pour-plating) or onto (e.g., surface-plating) the nutrient medium in the culture device.

After a sufficient incubation period at a temperature suitable for the growth of the microorganisms suspected of being present in the sample, microbial colonies can be detected and counted using an imaging system to capture an image of microbial colonies in a culture device and applying various image-analysis schemes. Examples of imaging systems used to count and/or differentiate microbial colonies in a culture device can be found in International Publication No. WO 98/59314; and U.S. Pat. Nos. 7,298,885; 8,094,916; and 7,496,225; which are incorporated herein by reference in their entirety. Examples of image analysis schemes to detect and/or enumerate microbial colonies in a culture device can be found in U.S. Pat. Nos. 6,058,209 and 6,243,486, which are incorporated herein by reference in their entirety.

The present disclosure is directed to techniques for counting microbial colonies in an image of a culture device (e.g., a thin film culture device). The techniques can be used to improve the accuracy of automated counts of microbial colonies in a culture device. The counting rules disclosed herein may be used individually, or may be used in combination with other counting rules such as, for example, the counting rules disclosed in International Patent Publication No. WO 2005/062744 and in International Patent Publication No. WO 2014/09943, which are both incorporated herein by reference in their entirety.

The counting rules disclosed herein are typically stored as computer-executable software instructions, and are executed by a processor in a biological scanning system or an image-analyzing system (e.g., a processor and image-analysis software, optionally coupled to a scanning device). Alternatively, the rules may be implemented in hardware such as an application specific integrated circuit (ASIC), a field programmable gate array (FPGA), or various hardware components known in the art. The rules described herein may be applied individually, or in any combination with other counting rules depending on the growth medium being scanned. In any case, by applying the rules described herein, the accuracy of automated counts of microbial colonies on a culture device (e.g., a thin film culture device) can be improved.

In any embodiment, a method of the present disclosure employs a system for detecting and counting microbial colonies in a culture device. Systems for detecting and counting microbial colonies in a culture device are described, for example, in International Patent Publication Nos. WO 96/18720, WO 96/18167, WO 2005/062744, which are all incorporated herein by reference in their entirety.

FIG. 1 shows a perspective view of one embodiment of a system 20 for detecting and counting microbial colonies in a culture device. The system 20 comprises a scanner 21 coupled to an external computer 22 which performs imaging analysis of the images generated by the scanner. External computer 22 may include, for example, a microprocessor programmed for image analysis of a culture device 24. External computer 22 may comprise a personal computer (PC), desktop computer, laptop computer, handheld computer, workstation, tablet personal computing device, mobile device or the like. For example, software programs can be loaded on external computer 22 to facilitate image analysis of images of culture device 24 generated by scanner 21.

Scanner 21 is coupled to external computer 22 via interface 25. Interface 25, for example, may comprise a Universal Serial Bus (USB) interface, a Universal Serial Bus 2 (USB2) interface, an IEEE 1394 Fire Wire interface, a Small Computer System Interface (SCSI) interface, an Advance Technology Attachment (ATA) interface, a serial ATA interface, a Peripheral Component Interconnect (PCI) interface, a conventional serial or parallel interface, wireless connection or the like.

The culture device 24 optionally may include indicia 29, such as a bar code or other type of identification marking used to identify culture device 24. RFID tags, two-dimensional optically detectable codes, or the like, may also be used as indicia. In any case, indicia 29 may identify the type of microorganism being grown and tested on the culture device 24. Scanner 21 can be designed to draw the culture device 24 into scanner 21 to a first location and generate an image of indicia 29, and then draw the culture device 24 to a second location and generate an image of the growth area 27. In this manner, images of indicia 29 and growth area 27 of the culture device can be generated by system 20. Alternatively, a single image may capture both indicia 29 and the growth area 27. In either case, the scanning of indicia 29 can facilitate identification of the type of plate being used so that one or more desirable counting rules can be applied in an automated fashion.

By way of example, the culture device 24 may comprise a thin film culture device sold by 3M under the trade name PETRIFILM plates. Culture device 24 can be utilized to facilitate the rapid growth and detection of microorganisms commonly associated with food contamination by gas-producing microorganisms, including, for example, E. coli, coliform bacteria, enterobacteria, Salmonellae, or the like. Culture devices generally comprise a type of growth medium commonly used for biological growth and bacterial detection and enumeration. The invention, however, may also be applied with other types of growth media as discussed herein.

In any embodiment, the thin film culture device can have a front side that comprises a transparent film cover sheet and a back side comprises a translucent substrate, such as a PETRIFILM E. coli/Coliform Count Plate, a PETRIFILM Coliform Count Plate, and a PETRIFILM Enterobacteriaceae Count Plate, for example. Without being bound by theory, it is believed the combination of a relatively thin (e.g., approximately 1-2 mm thick) culture medium disposed between a translucent film and a transparent film provides optical conditions that are beneficial for distinguishing gas-producing colonies according to the present disclosure.

In order to improve the accuracy of automated counts of microbial colonies on a culture device, various aspects of the methods of the present disclosure establish rules that can be applied during image processing. In other words, the rules described in greater detail below can form part of a colony counting algorithm executed in system 20 or in an image-analysis system (not shown) that does not receive the images directly from an imaging device. The rules may be used individually or in any combination with other image analysis rules (the counting rules described in International Patent Publication No. WO 2005/062744), depending on the type of growth medium being scanned and the problems that may be encountered. Application of one or more of the counting rules can improve a biological scanning system such as system 20, for example, by improving the accuracy of automated counts of microbial colonies on a growth medium such as a thin film culture device or the like.

Figure 2:
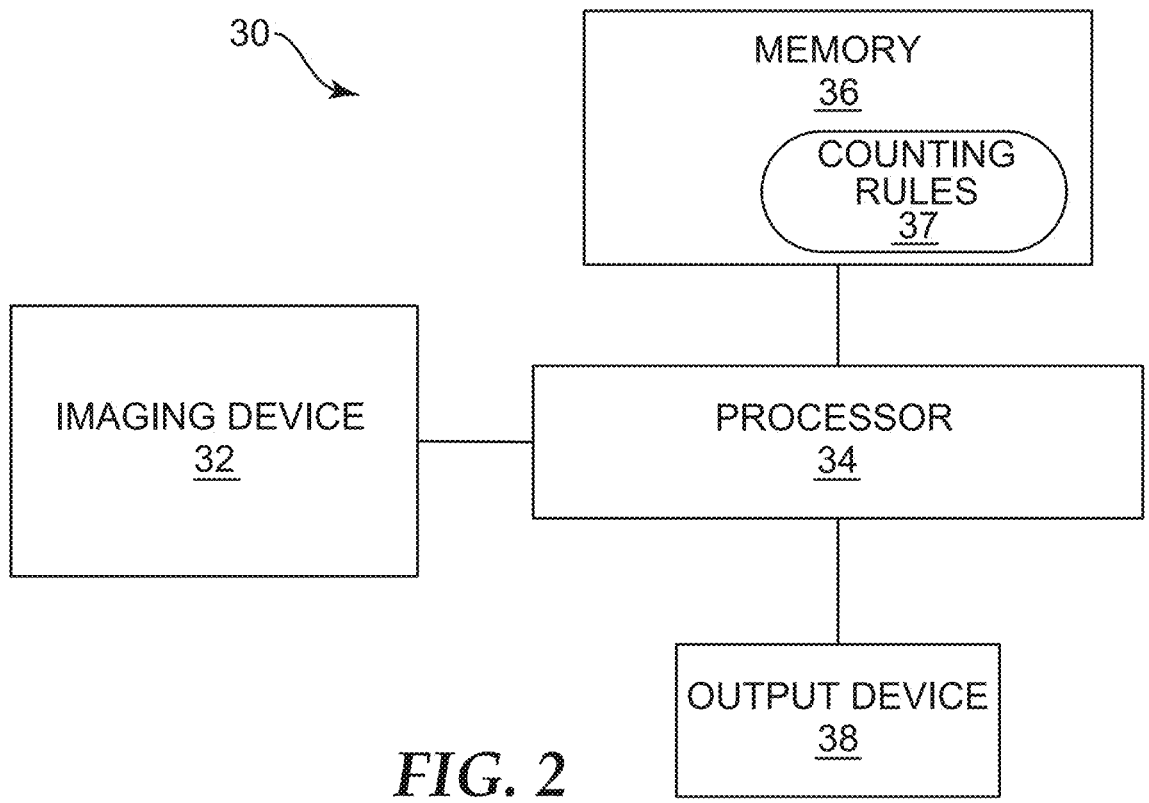
FIG. 2 is a block diagram of a biological scanning system that may correspond to the system illustrated in FIG. 1.

FIG. 2 is a block diagram of a biological scanning system 30, which may correspond to system 20 (FIG. 1). System 30 includes an imaging device 32 that generates one or more images of a growth medium and provides the images to processor 34. Processor 34 is coupled to memory 36. Memory 36 stores various processor-executable software instructions that facilitate image analysis of the images generated by imaging device 32. In particular, memory 36 stores one or more counting rules 37 which are applied during image analysis to improve the accuracy of automated counts of microbial colonies on a culture device. Output device 38 receives the results determined by processor 34 and provides the results to a user.

By way of example, imaging device 32 may comprise a 2-dimensional monochromatic camera for generating one or more images of a culture device. Various illuminators (not shown) may be used to illuminate the front and back of culture device. For example, the illuminators can illuminate the culture device with one or more colors, and one or more images of the culture device can be generated by imaging device 32. In addition, a controller (not shown) can control a ratio of front-side illumination to back side illumination for each image of the culture device. A non-limiting example of an imaging device that provides front-side and back-side illumination, optionally with a plurality of illumination colors, that can be used to image a thin film culture device is described in U.S. Pat. No. 8,094,916, which is incorporated herein by reference in its entirety.

Methods of analyzing an image according to the present disclosure involve using at least one image of a culture device. Optionally, the method may use two images; each image obtained using different conditions to illuminate the culture device, to more-accurately distinguish gas-producing microbial colonies. A first image can be obtained while illuminating the "front side" of a culture device (i.e., the side of the culture device facing the imaging device). The front side of a thin film culture device is the side with the transparent cover sheet. A second image can be obtained while illuminating the "back side" of the culture device. The back side of a thin film culture device is the side opposite the cover sheet. In many PETRIFILM configured to detect gas-producing microbial colonies plates (e.g., PETRIFILM E. coli/Coliform Count Plates, PETRIFILM Coliform Count Plates, PETRIFILM Rapid Coliform Count Plates, and PETRIFILM Enterobacteriaceae Count Plates), the back side of the thin film culture device comprises a translucent polymeric film.

Illuminating the "front side" of a culture device can comprise exposing the culture device to illumination coming from illuminators illuminating the front side of the device. In an embodiment, the first image can be obtained using 100% of the illumination coming from illuminators illuminating the front side of the culture device and 0% of the illumination coming from illuminators illuminating the back side of the culture device. In another embodiment, for example, a first image can be obtained using 80% of the illumination coming from illuminators illuminating the front side of the culture device and 20% of the illumination coming from illuminators illuminating the back side of the culture device. The ratio of front-side illumination to back-side illumination can be selected to provide optimum contrast for a particular type of nutrient medium in the culture device.

In any embodiment of the method, the first image is produced while illuminating the device with a first ratio (e.g., 100%:0%) of front-side illumination to back-side illumination and the second image is produced while illuminating the device with a second ratio (e.g., 0%:100%) of front-side illumination to back-side illumination that is lower than the first ratio. In any embodiment, the first ratio can be greater than 1:1. In any embodiment, the second ratio can be less than 1:1.

It should be noted that "first image", as used herein, refers to an image that is obtained while the culture device receives illumination primarily from the front side of the plate and "second image", as used herein refers to an image that is obtained while the culture device receives illumination primarily from the back side of the plate. An implied temporal order of obtaining the images is not intended by the use of the terms "first image" and "second image". Accordingly, a first image of a culture device can be obtained before or after a second image of the culture device. In addition, one of the images (e.g., the first image or second image, respectively) does not need to be obtained by the imaging culture device immediately after obtaining the other image (e.g., the second image or first image, respectively). It is recommended the first and second images are obtained closely enough in time to obviate the possibility of significant biological changes (e.g., growth or enzyme activity) or physical changes (e.g., dehydration) occurring during the intervening time between image acquisitions. Thus, in a preferred embodiment, the first image is obtained within about 30 seconds of the time at which the second image is obtained.

A person having ordinary skill in the art will recognize that, in a system wherein the imaging device is positioned facing the front side of the culture device and the illuminators are also positioned such that the illumination is directed at the front side of the culture device, the image produced by the imaging device substantially comprises light that is reflected from the culture device and the contents thereof. In addition, the person having ordinary skill in the art will also recognize that, in a system wherein the imaging device is positioned facing the front side of the culture device and the illuminators are also positioned such that the illumination is directed at the back side of the culture device, the image produced by the imaging device substantially comprises light that is transmitted by and/or refracted by the culture device and the contents thereof.

Illuminating the "back side" of a culture device can comprise exposing the culture device to illumination coming from illuminators illuminating the back side of the device. In an embodiment, the second image can be obtained using 100% of the illumination coming from illuminators illuminating the back side of the culture device and 0% of the illumination coming from illuminators illuminating the front side of the culture device. In another embodiment, for example, a second image can be obtained using 80% of the illumination coming from illuminators illuminating the back side of the culture device and 20% of the illumination coming from illuminators illuminating the front side of the culture device. The ratio of front-side illumination to back-side illumination can be selected to provide optimum contrast for a particular type of nutrient medium in the culture device.

Figure 6:
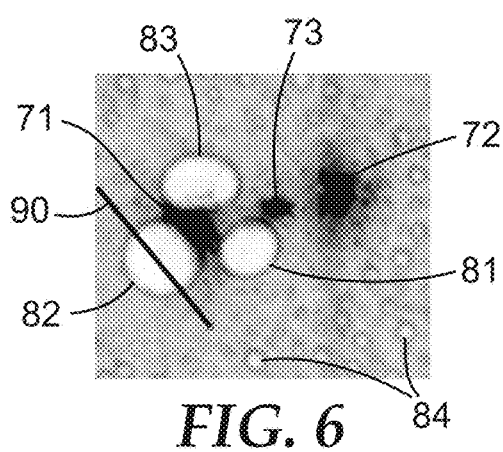
FIG. 6 is a black-and-white image of a portion of a thin film culture device, wherein the image was obtained while illuminating only the back side of the culture device.
Figure 7:
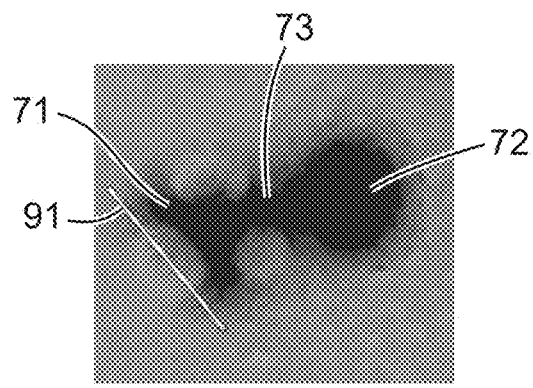
FIG. 7 is a black and white image of the portion of the thin film culture device of FIG. 6, wherein the image was obtained while illuminating only the front side of the culture device.

In any embodiment of the methods of the present disclosure, it may be desirable to use only images obtained with back-side illumination or images used with front-side illumination. As illustrated in FIGS. 6 and 7 and discussed below, back-side illumination can provide particularly enhanced contrast between the culture medium and a gas bubble (e.g., the perimeter of a gas bubble) in a thin film culture device.

The images are provided to processor 34 and may also be stored in memory 36. In any case, the images are analyzed by applying counting rules 37 in order to determine bacteria counts on the culture device. The resolution of imaging device 32 may be approximately 155 pixels per centimeter. In that case, a one centimeter line in the image is 155 pixels long.

Processor 34 may comprise a general-purpose microprocessor that executes software stored in memory 36. Alternatively, processor 34 may comprise an application specific integrated circuit (ASIC) or other specifically designed processor. In any case, processor 34 executes various counting rules 37 to improve the accuracy of automated counts of microbial colonies on a culture device.

Memory 36 is one example, of a computer readable medium that stores processor executable software instructions applied by processor 34. By way of example, memory 36 may comprise random access memory (RAM), read-only memory (ROM), non-volatile random access memory (NVRAM), electrically erasable programmable read-only memory (EEPROM), flash memory, or the like. Counting rules 37 such as those described below, are stored in memory 36 and may form part of a larger software program used for image analysis.

Output device 38 typically comprises a display screen used to communicate results to a user. However, output device 38 could also comprise other types of devices such as a printer or the like. Output device 38 may form part of a scanning unit, such as display (not shown), or may be external to the scanning unit, such as the display screen of external computer 22 (FIG. 1).

Figure 3:
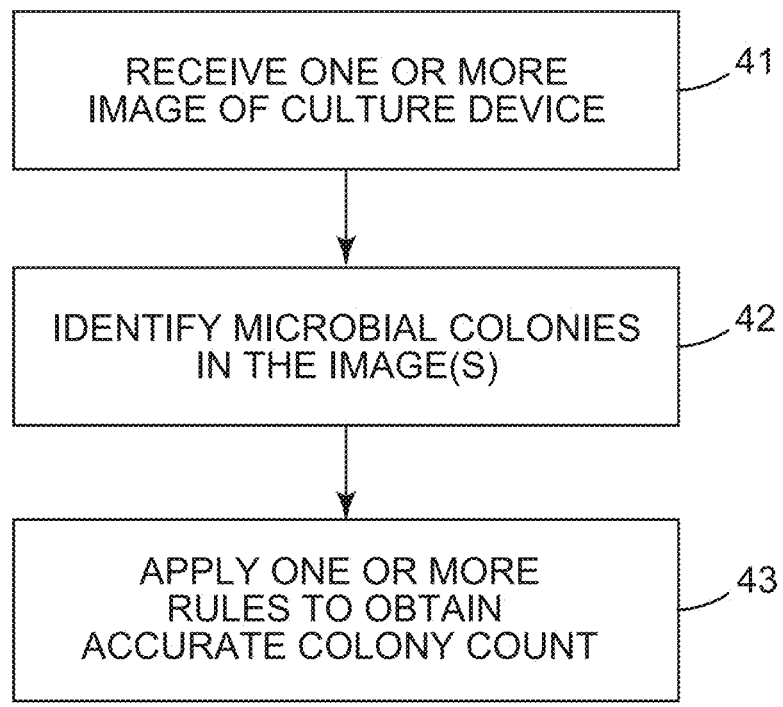
FIG. 3 is a flow diagram illustrating a process of automated analysis of a microbial culture device.

FIG. 3 is a flow diagram illustrating a process of automated culture device analysis. As shown in FIG. 3, processor 34 receives one or more images of a culture device (step 41). Processor 34 invokes various software routines from memory 36 to identify the microbial colonies on the culture device (step 42). For example, bacterial colonies may be identified according to a characteristic color they produce after reacting (i.e., directly or indirectly) with one or more indicator compounds in the nutrient medium. Other aspects of colony recognition are discussed herein. The software executed by processor 34 can allow for identification of the growth area on the culture device and automated counting of bacterial colonies based on color changes in the growth area where the colonies have grown during incubation. Optionally, the processor can invoke a routine to count the identified microbial colonies. Gas-producing colonies can be segregated into a count that is separate from a count of colonies that do not produce gas in the culture device.

In accordance with a method of present disclosure, processor 34 applies one or more rules to improve the accuracy of the count of microbial colonies on the growth medium (step 43). The rules may be applied individually or various combinations of rules may be used, depending on the type of culture device being analyzed. The rules may be individually invoked from memory 36 or may form sub-routines of a larger image analysis software program. The rules may be applied individually or various sets of the rules may be applied. If a set of rules are used, then the order in which the rules are applied may be selected based on the type of plate being scanned to obtain one or more image. The selected order for application of the rules may affect the end result. Various subsets of the rules may also be applied in any order, and the selected order for a subset of rules may also affect the end result.

Figure 4:
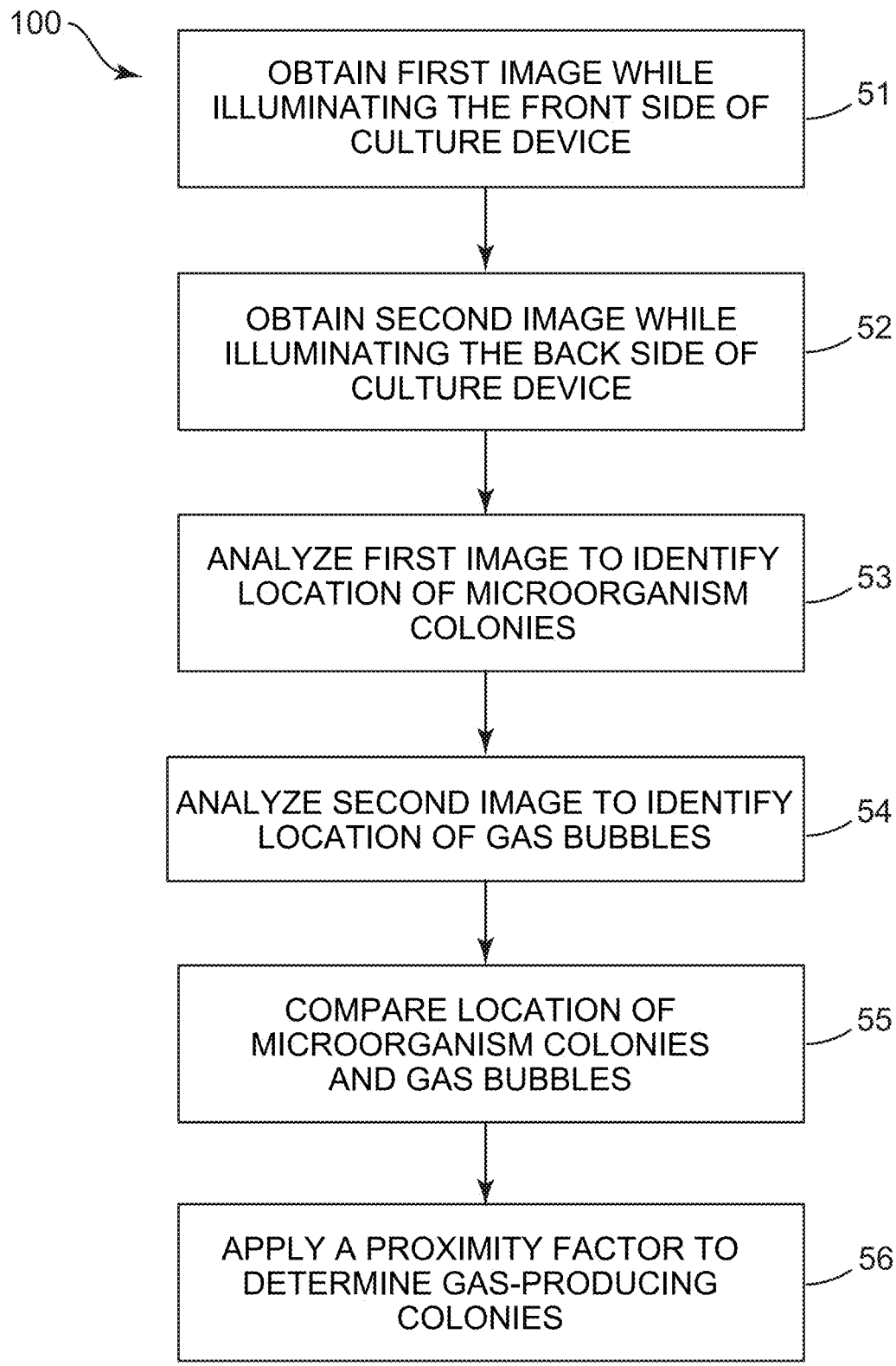
FIG. 4 is a block diagram of one embodiment of a method of analyzing a microbial culture device according to the present disclosure.

FIG. 4 shows one embodiment of a method 100 according to the present disclosure. The method comprises the step 51 of obtaining a first image while illuminating the front side of a culture device and the step 52 of obtaining a second image while illuminating the back side of the culture device. The front side and back side of the culture device can be illuminated with an imaging system as disclosed herein. The method 100 further comprises the step 53 of analyzing the first image to identify the location of microorganism colonies in the culture device. The method 100 further comprises the step 54 of analyzing the second image to identify the location of gas bubbles in the culture device.

Analyzing the second image to identify the location of a gas bubble can comprise identifying a gas bubble as an object (in the image) that is distinguishable from the culture medium in the culture device. Identifying the gas bubble as an object distinguishable from the culture medium can be done by applying image analysis techniques disclosed by Weiss (U.S. Pat. No. 6,381,353). Analyzing the images can include RGB (red/green/blue) image processing algorithms. Alternatively, or additionally, analyzing the images can include HSI (hue, saturation, and intensity), HSL (hue, saturation, and lightness), HSV (hue, saturation, and value) algorithms, or combinations thereof. Because the gas bubbles produced by gas-producing colonies often displace some or all of the culture medium disposed between the cover sheet and the substrate of a thin film culture device, a gas bubble can be detected as a region in the image with substantially less color than the surrounding culture medium and/or microbial colony. However, the unique configuration of the thin film culture devices permits an alternative approach to detect the presence of a gas bubble in the image—detecting a relatively dark annulus surrounding the gas bubble.

Without being bound by theory, the edge of the gas bubble contacting the culture medium can serve as a lens to permit the transmission of light throughout the gas bubble. In addition, the edge can serve as a mirror to reflect the image of the transmitted light. Thus, because the culture medium and colonies are typically colored and the color is typically darker than the substrate forming the back of the thin film culture device, the transmitted (and reflected) image of the culture medium and/or colony forms a relatively dark-colored annulus surrounding the relatively light-colored central portion of the gas bubbles. This dark annulus can be detected as a sharp color and/or brightness change that is easily distinguishable from the culture medium and from microbial colonies, which are typically darker than the culture medium, as shown in FIG. 6 and described in Example 1.

The first and second images are obtained so as to define objects in the image in shades of at least one color. Thus, analyzing the first and/or second images to identify microorganism colonies in each image can comprise identifying objects in the image as colonies according to image analysis methods that are well known in the art. For example, Weiss describes techniques to identify objects (e.g., microbial colonies) in an image based upon one or more criteria including object size, visibility, color, surface quality, and shape (U.S. Pat. No. 6,243,486, which is incorporated herein by reference in its entirety). As discussed above, a method to detect a microbial colony that reacts with an indicator compound comprising TTC can be configured to detect a shade of the color red and a method to detect a microbial colony that reacts with an indicator compound comprising 5-bromo-4-chloro-3-indolyl-β-D-glucuronide can be configured to detect a shade of the color blue.

Analyzing the first and/or second images to identify microorganism colonies in the image comprises identifying the location any colonies detected in the images. The location of a colony in the culture device is used to compare the location of the colony to a location of a gas bubble in the culture device. The location of a colony or a gas bubble can be identified by X-Y coordinates in the image. Thus, in a preferred embodiment, both the first and second images are obtained without moving or otherwise handling the culture device after the first image is obtained but before the second image is obtained. Alternatively, registration landmarks (e.g., two or more corners of a PETRIFILM plate, or registration marks made on any culture device) can be used to orient the images properly in order to determine and compare the location of objects (e.g., colonies, gas bubbles) in the first and second images.

After analyzing the first and second images to identify the location of the microorganism colonies and gas bubbles in the culture device, the method 100 further comprises the step 55 of comparing the locations of the microorganism colonies and the gas bubbles. Comparing the locations can comprise calculating the distance (e.g., in pixels) between a particular microbial colony and one or more gas bubbles proximate the colony. This distance can be used to determine whether the gas bubble is associated with a particular colony and, thereby, conclude the particular colony is a gas-producing microbial colony.

The Interpretation Guide provided by the manufacturer for use with PETRIFILM *E. coli*/Coliform Count Plates provides guidance regarding the determination whether a gas bubble is associated with a particular colony. In part, the guidance relates to the proximity of the gas bubble to a microbial colony. In general, a gas bubble contacting a particular microbial colony is regarded as being associated with (i.e., produced by) the colony. In addition, a gas bubble that is located within a distance equal to about three colony diameters is regarded as being associated with (i.e., produced by) the colony. Thus, analyzing an image (e.g., the first image or second image disclosed herein) to identify a presence or a location of a gas-producing microorganism according to the present disclosure comprises analyzing the image to identify the presence or location of one or more gas bubbles. The location of a gas bubble relative to any proximate microbial colonies is used to determine whether the gas bubble produced by the microorganisms that form the colony.

Analyzing an image (e.g., the first image or second image disclosed herein) to identify a presence or a location of one or more gas bubble further can comprise analyzing the image to determine a size parameter (e.g., the radius, the diameter, and/or the area) of the one or more gas bubble in the image. The size parameter can be determined by calculating a number of pixels in the radius, diameter, or area of the gas bubble, for example. When a plurality of gas bubbles are observed in an image, the size parameters for each of the plurality of gas bubbles can be compared, for example, in a histogram. The histogram can show the distribution of sizes (e.g., radii, diameters, or areas) of gas bubbles found in the image. In addition, the histogram may show gaps in the size distribution of the gas bubbles. These gaps can be used to differentiate abiogenic gas bubbles from biogenic gas bubbles.

International Patent Publication No. WO2012/012104, which is incorporated herein by reference in its entirety, describes the presence of small, abiogenic gas bubbles that may be observed in a thin film culture device. The application further discloses the diminution or disappearance of the abiogenic gas bubbles within a region surrounding a microbial colony as the microbial colony develops. The abiogenic bubbles and the region (i.e., the region devoid of abiogenic gas bubbles) surrounding a microbial colony can be clearly seen in FIG. 6, described below. Thus, any embodiment of a method of the present disclosure may further comprise calculating a number of gas bubbles in a region surrounding a colony. The area of the region surrounding the colony can be less than or equal to about five times the area of the colony, for example. The method optionally may comprise comparing a number of observable gas bubbles within the region proximate a microbial colony to a number of observable gas bubbles in another region (e.g., a "control" region) of the nutrient medium in the culture device that does not comprise a colony. When this comparison is made, if the number of observable gas bubbles in the region proximate the microbial colony is substantially lower than the number of observable gas bubbles in the control region, the presence of a first gas bubble proximate the microbial colony, regardless of the size of the first gas bubble, may indicate the microbial colony is a gas-producing microbial colony.

In any embodiment, the method of the present disclosure further can comprise comparing the size parameter of a first gas bubble to the size parameter of a second gas bubble. When a plurality of gas bubbles is present in the image, comparing the size parameter of the first gas bubble to the size parameter of a second gas bubble can comprise creating a histogram of the size parameter values for each of the plurality of gas bubbles. The distribution of size parameter values (e.g., radii, diameters, or areas) may reveal clusters of similarly-sized gas bubbles. The clusters can be divided into one or more groups.

The histogram can be used to determine a threshold size parameter value (e.g., for the bubble radius, diameter, or area) or a size parameter range that is used to distinguish a first gas bubble that is produced by a gas-producing microorganism from a second gas bubble that is not produced by a gas-producing microorganism. Advantageously, comparing the size of a plurality of gas bubbles observed in the culture device can be used to distinguish abiogenic gas bubbles, which tend to have a relatively uniform size, from gas bubbles produced by a microbial colony, which are frequently larger than the abiogenic gas bubbles.

The Interpretation Guide provided by the manufacturer for use with PETRIFILM *E. coli*/Coliform Count Plates provides additional guidance regarding the determination whether a gas bubble is associated with a particular colony. In general, when a gas bubble is proximate a particular microbial colony and the gas bubble has a diameter that is about equal to or greater than the diameter of the proximate colony, the gas bubble is regarded as being associated with (i.e., produced by) the colony. However, a person having ordinary skill in the art will recognize there may be instances (e.g., when the sample and/or culture device comprises a nutrient that inhibits microbial gas production) wherein a gas bubble associated with a gas-producing colony may have a size parameter value (e.g., diameter) that is smaller than gas-producing microbial colony with which it is associated.

Figure 5:
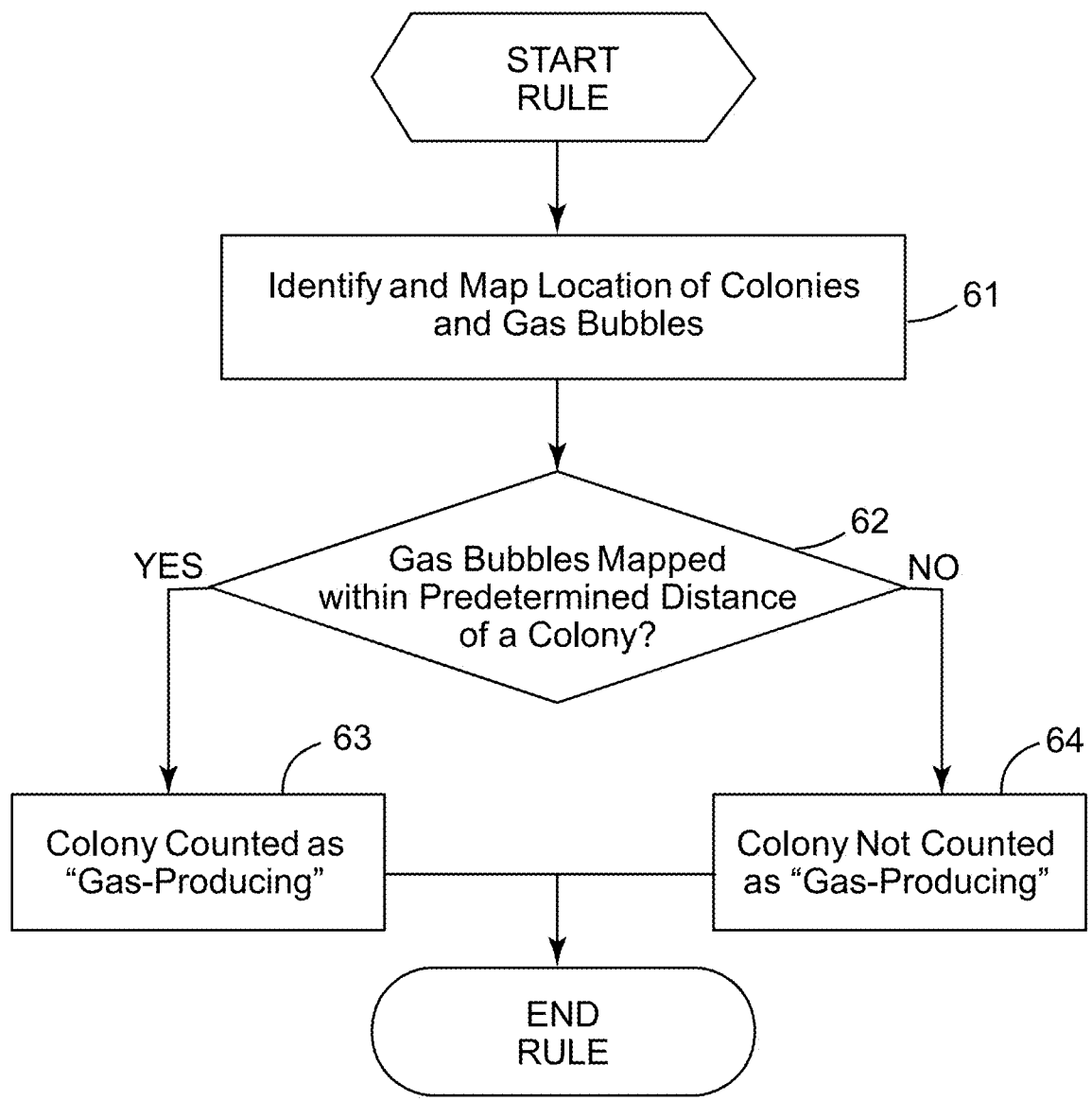
FIG. 5 is a flow diagram of a counting rule to distinguish gas-producing microbial colonies according to the present disclosure.

FIG. 5 is a flow diagram illustrating the rule for differentiating colonies into a plurality of colony types according to the present disclosure. As illustrated in FIG. 2, processor 34 invokes software stored in memory 36 to identify and map the location of colonies and gas bubbles in the first and second images (step 61). In particular, processor 34 determines whether a colony that is identified and located using the first image maps to a location proximate a gas bubble that is identified and located using the second image (step 62). If colonies that are proximate gas bubbles are found when analyzing the first and second images, the processor 34 applies a proximity factor to decide whether the gas bubble is associated with (i.e., produced by) the proximate colony. If the gas bubble is within a predetermined distance of the colony (e.g., within the equivalent of about three colony diameters), as discussed above, the colony in the culture device is counted as a first type (e.g., a "Gas-Producing"; see step 63, FIG. 5). If the gas is not within a predetermined distance of the colony (e.g., further away than the equivalent of about three colony diameters), as discussed above, the colony in the culture device is counted as a second type (e.g., a "Non-Gas-Producing"; see step 64, FIG. 5).

Optionally, additional steps (not shown) can be added to the counting rule illustrated in FIG. 5. The additional step can be inserted into the sequence of steps at any point after step 61 and before step 63 or step 64. A first additional step relates the map location of each gas bubble with the size (e.g., diameter or area) of the gas bubble in the image. A second additional step compares the size of the gas bubble to a predetermined size value (or a range of predetermined size values) to determine whether the size of a particular gas bubble is less than, greater than or equal to the predetermined size value or to determine whether the size of the particular gas bubble is within the predetermined range. Thus, a counting rule comprising the additional steps utilize two parameters (i.e., size of a gas bubble and the proximity of the gas bubble to a colony) associated with each gas bubble) to make a determination whether the gas bubble is associated with microbial activity (i.e. determine whether a microbial colony should be counted as a gas-producing microbial colony).

In some embodiments of the method, identifying a microbial colony as a gas-producing microbial colony can permit the operator to identify a particular classification or group to which the microorganism in the colony belongs. For example, if the culture medium comprises nutrients and selective agents that facilitate the growth of Gram-negative enteric bacteria and the fermentable nutrient in the culture medium is lactose, the microorganisms can be presumptively identified as belonging to a group of bacteria known as coliform bacteria. In another example, if the culture medium comprises nutrients and selective agents that facilitate the growth of Gram-negative enteric bacteria and the fermentable nutrient in the culture medium is glucose, the microorganisms can be presumptively identified as belonging to a family of bacteria known as *Enterobacteriaceae.*

FIG. 6 shows a black-and-white image of a portion of the growth area of a thin film culture device. The image was obtained while illuminating only the back side of the culture device, as described in Example 1. Within the growth area are a plurality of microbial colonies (71-73). Also shown in FIG. 6 is a plurality of gas bubbles (81-84). It can be observed that gas bubbles 81-83 have an area that is larger than at least one microbial colony (e.g., colony 71) that is proximate (i.e., within a distance that is less than or equal to about three colony diameters) the gas bubbles. Thus, according to the method of the present disclosure, all three of the gas bubbles (bubbles 81-83) would be considered "biogenic" gas bubbles (i.e., they were produced by microorganisms in the sample). In contrast, there are numerous, very small gas bubbles 84 distributed throughout the culture medium in the growth area of the culture device. Because these bubbles (i.e., gas bubbles 84) are evident in the culture device shortly after it is inoculated (i.e., hours before microbial colonies appear in the culture device) and because the area (volume) of the bubbles does not increase (e.g., generally, they remain substantially smaller than a typical microbial colony diameter) after prolonged incubation, they are considered "abiogenic" gas bubbles (i.e., they are not produced by microorganisms in the sample), as discussed above. Also shown in FIG. 6 is a path 90 of a line scan of a portion of the growth area of the culture device. Path 90 traverses a portion of the image that includes gas bubble 82.

When a larger portion of the image shown in FIG. 6 was analyzed to determine the area of the gas bubbles, it was observed that, for this image, the average area of approximately ninety of the abiogenic gas bubbles (i.e., gas bubbles 84) was less than or equal to 50 pixels (i.e., an area of about 50 pixels represented the upper size limit of the relatively small, abiogenic gas bubbles. In contrast, the individual area of each of the biogenic (i.e., associated with microbial activity) gas bubbles 81-83 in the two-dimensional image of FIG. 6 was approximately 625 pixels, 1125 pixels, and 875 pixels, respectively. Thus, the gap in size between the relatively tight cluster of abiogenic gas bubbles (i.e., those gas bubbles having an area less than or equal to about 50 pixels) and the relatively loose cluster of biogenic gas bubbles (i.e., those gas bubbles having an area greater than or equal to about 500 pixels) can be used to set a lower threshold value (e.g., about 75 pixels, about 100 pixels, about 200 pixels, or about 250 pixels) that can be used to designate biogenic gas bubbles in a particular image. In any embodiment, this threshold can be set using a dynamic calculation (i.e., calculated based upon the bubble population of a particular image of a particular culture device), which bases the threshold on a set percentage (e.g., about 125%, about 200%, about 300%, about 400%) of the maximum size parameter value of the abiogenic gas bubble group.

Thus, according to a method of the present disclosure, the gas bubbles can be classified into at least two group; a first group having a two-dimensional area of about 50 pixels or less and a second group having a two-dimensional area greater than about 50 pixels. Accordingly, the gas bubbles classified (e.g., according to size) into the first group can be identified as suspect abiogenic gas bubbles (i.e., probably not microorganism-associated). Conversely, gas bubbles classified (e.g., according to size) into the second group can be identified as suspect biogenic gas bubbles (i.e., probably microorganism-associated). In any embodiment of the method, a lower size limit can be assigned for the second group. For example, the lower size limit for the second group may be a size parameter value that is at least 50 percent larger, at least 100% larger, or at least 150% larger than the estimated upper size limit of the abiogenic gas bubbles. According to the method, any culture device having a gas bubble that has a size parameter value falling between the upper size limit of the first group and the lower size limit of the second group could optionally be flagged for review by a technician.

In some embodiments of the method, an upper size limit for the suspect biogenic gas bubbles can be assigned (e.g., by running control culture devices to establish the maximum size of biogenic gas bubbles for given microorganisms). In these embodiments, a gas bubble exceeding the upper size limit of the second group would be classified into a third group. The third group includes relatively large abiogenic gas bubbles which may have been introduced into the culture device during inoculation, for example, which may indicate operator usage problems. When a bubble exceeding the upper size limit is observed in an image, an advisory message may be posted to the operator.

FIG. 7 shows a black and white image of the same portion of the thin film culture device shown in FIG. 6. The image was obtained while illuminating only the front side of the culture device, as described in Example 1. Although the biogenic gas bubbles (i.e., gas bubbles 81-83 of FIG. 6) are visible, the contrast between the culture medium and the biogenic gas bubbles is significantly lower. In addition, the outer edge of the gas bubbles is not as clearly delineated in the image of FIG. 7 as it is in the back-lit image of FIG. 6. Also shown in FIG. 7 is a path 91 of a line scan of the portion of the growth area shown in FIG. 6. Path 91 corresponds to the same pixels as those in path 90 of FIG. 6.

Figure 8:
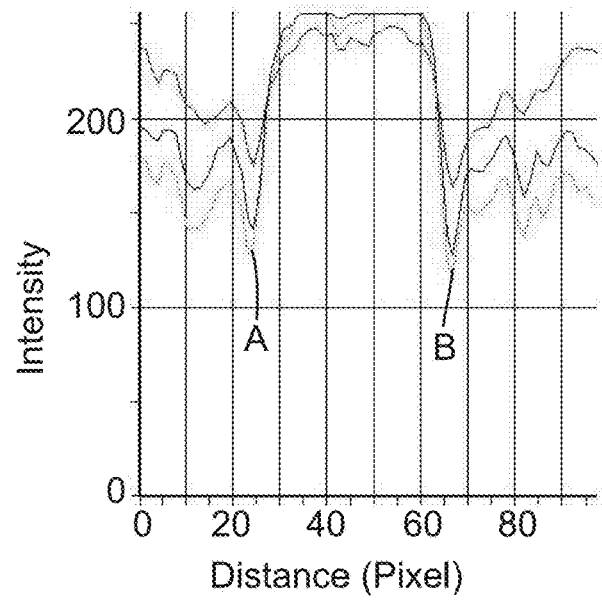
FIG. 8 is a graph of the relative intensities of red, green, and blue components, respectively, of the pixels in the line scan of FIG. 6.
Figure 9:
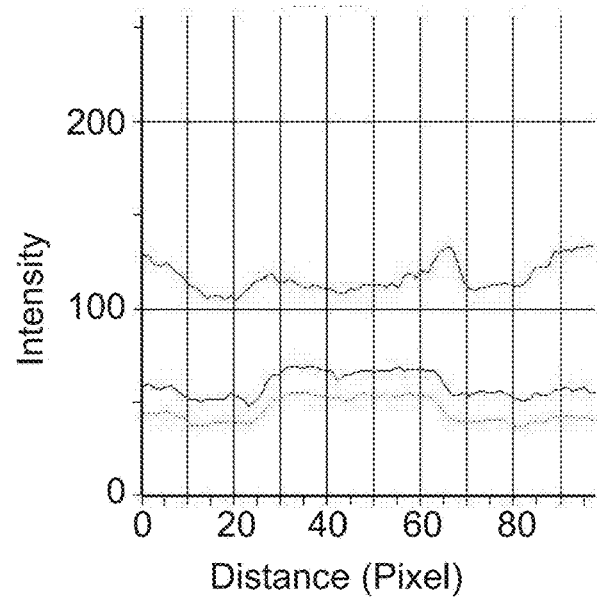
FIG. 9 is a graph of the relative intensities of red, green, and blue components, respectively, of the pixels in the line scan of FIG. 7.

In order to identify the presence and location of colonies in a back-lit image and to identify the presence and location of microbial colonies in a front-lit image, image-analysis algorithms often analyze the pixels in the digital image line-by-line, comparing the color hue and/or color intensity of a first pixel or first group of pixels to the color hue and/or color intensity of a second pixel proximate the first pixel or second group of pixels proximate the first group of pixels. This type of comparison permits the algorithm to recognize color and/or intensity shifts that may indicate the edge of a microbial colony, gas bubble, or other object in the image. FIG. 8 shows a graph of the transmitted color intensities for red, green, and blue from pixels along the line 90 in the back-lit image of FIG. 6. The sharp demarcation of the gas bubbles, as evidenced by dark annulus associated with the opposite edges of the perimeter of the gas bubble can be seen in the graph as sharp negative peaks (A and B, respectively). FIG. 9 shows a graph of the reflected pixel intensities for red, green, and blue obtained from pixels along the line 91 in the front-lit image of FIG. 7.

In addition to providing a method of analyzing an image to identify the presence and individual size of gas bubbles in a thin film culture device, the present disclosure also provides a method of analyzing an image to identify the two dimensional context of a particular gas bubble (e.g., a "first" gas bubble) in a thin film culture device. "Two-dimensional context" of a first gas bubble refers to the presence or absence of other gas bubbles within a predefined area proximate the first gas bubble. The presence and number of proximate gas bubbles can be used to determine whether the first gas bubble is a suspect biogenic gas bubble (i.e., probably associated with microbial activity) or is a suspect abiogenic gas bubble (i.e. probably not associate with microbial activity).

Figure 10A:
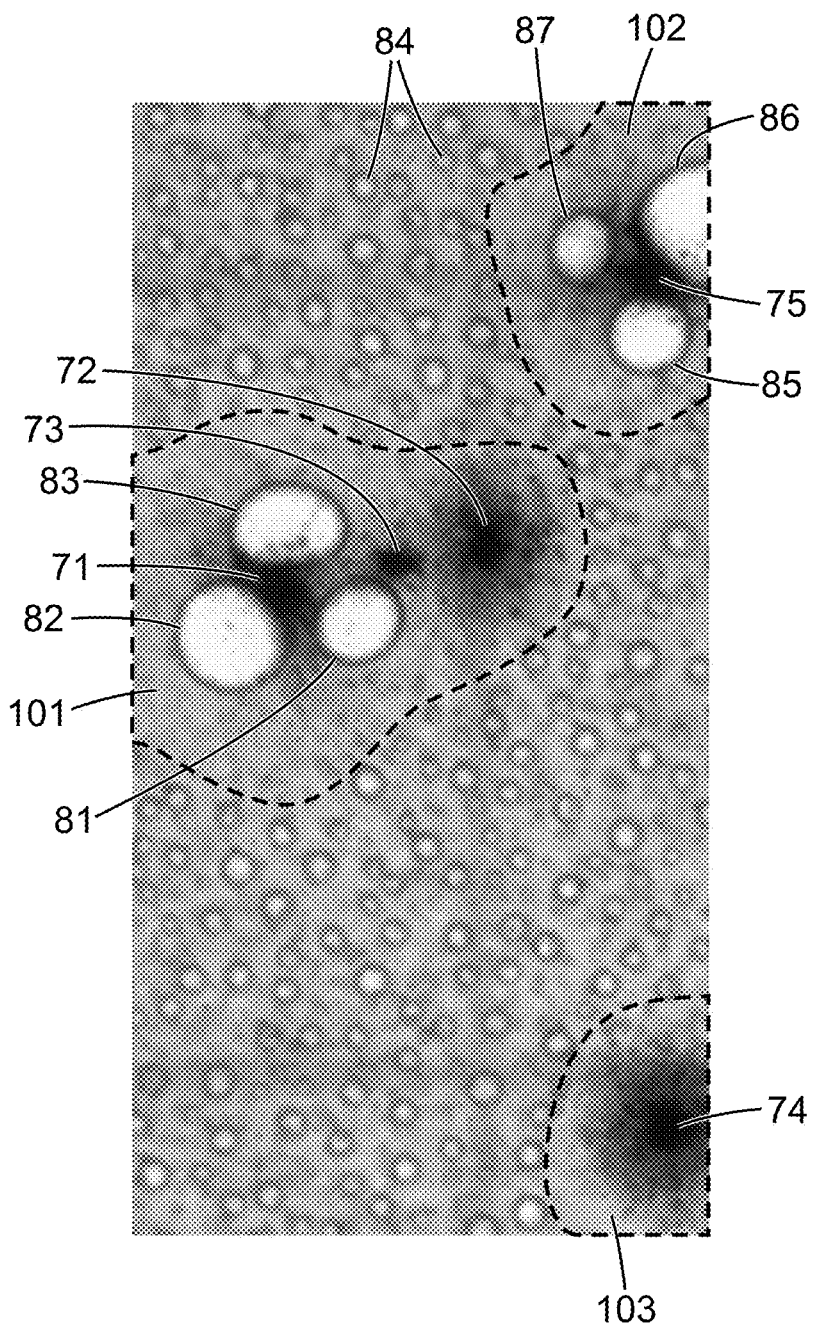
FIG. 10A is a black-and-white image of a portion of a thin film culture device showing gas-producing and non-gas producing colonies of microorganisms, wherein the image was obtained while illuminating only the back side of the culture device.

By way of example, FIG. 10A shows an image of a larger portion of the thin film culture device shown in the image of FIG. 6. In FIG. 10A, microbial colonies 71, 72, 73, 74, and 75 are evident by their interaction with the chromogenic indicators present in the culture medium. Also evident in FIG. 10A are abiogenic gas bubbles 84 and biogenic gas bubbles 81, 82, 83, 85, 86, and 87. In one aspect, the biogenic gas bubbles (81-83 and 85-87) can be identified as biogenic on the basis of their respective size and/or proximity to a microbial colony, as described herein. In another aspect, the biogenic gas bubbles can be identified on the basis of their two-dimensional context. FIG. 10A shows that, although abiogenic gas bubbles are substantially uniformly dispersed in a region of the culture medium that does not include a microbial colony (see FIG. 10B), the size of the abiogenic gas bubbles is substantially smaller or the abiogenic gas bubbles are substantially absent in regions (e.g., regions 101, 102, and 103 of FIG. 10A) of the culture medium that include one or more microbial colony. This observed phenomenon can be used to identify a suspect biogenic gas bubble without the need to observe a microbial colony proximate the particular suspect gas bubble.

Figure 10B:
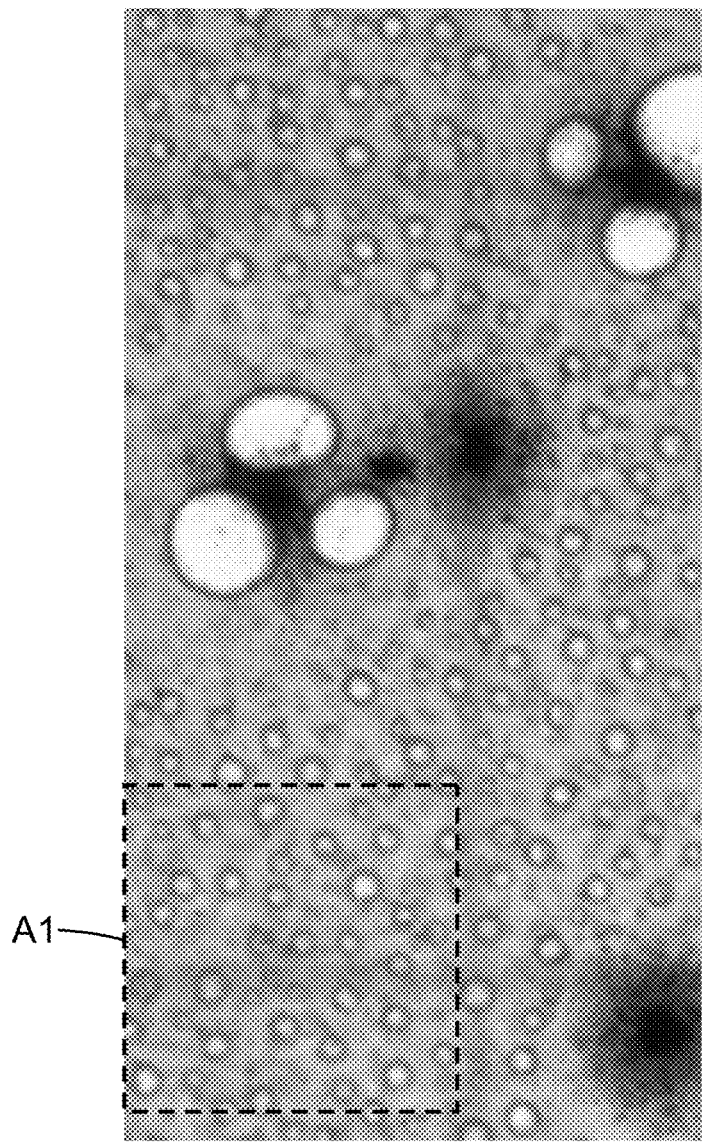
FIG. 10B is the black-and-white image of FIG. 10A showing a first masked area of the image.
Figure 10C:
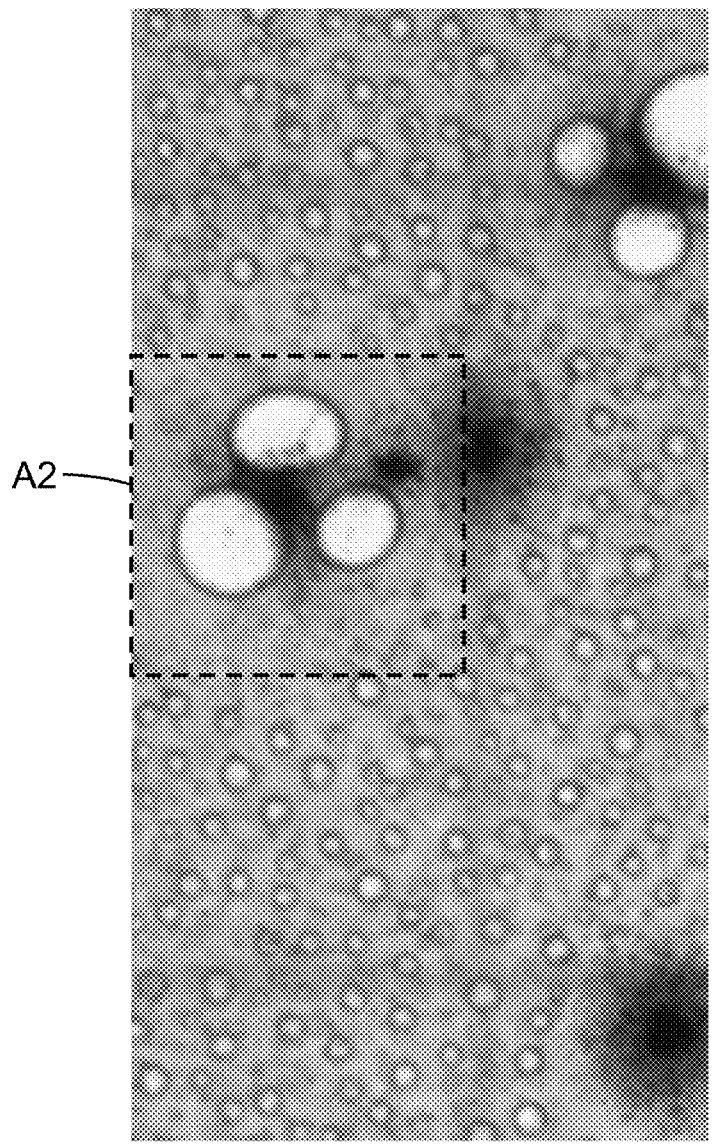
FIG. 10C is the black-and-white image of FIG. 10A showing a second masked area of the image.
Figure 10D:
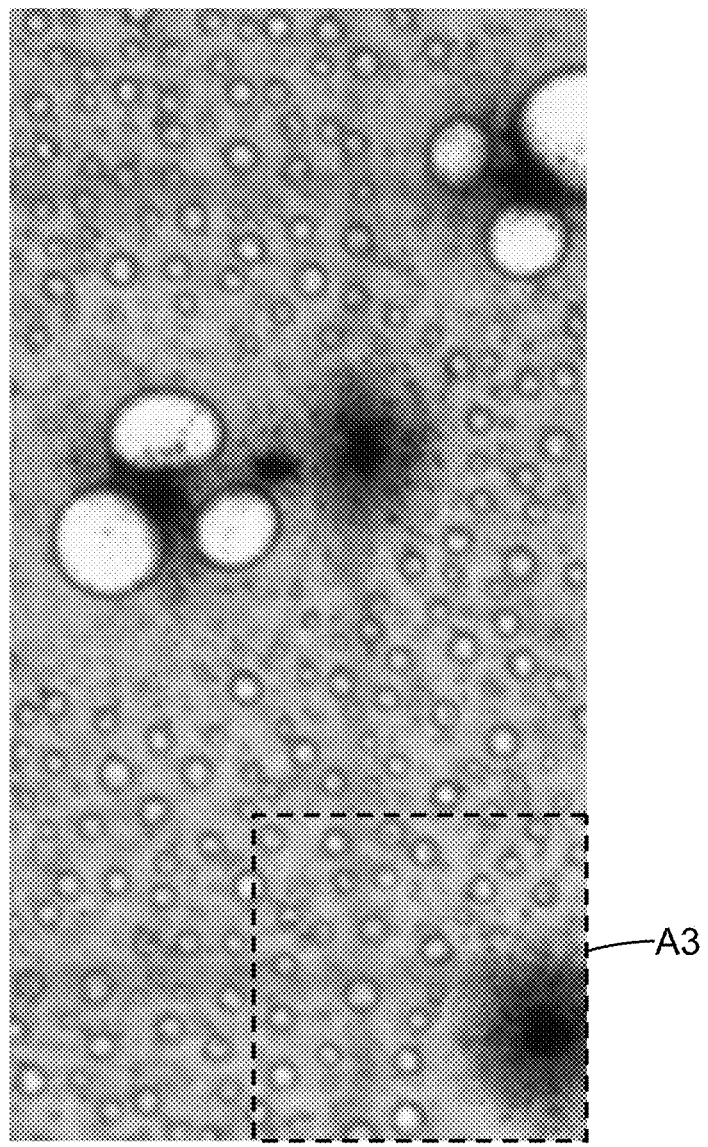
FIG. 10D is the black-and-white image of FIG. 10A showing a third masked area of the image.

One technique for analyzing the two-dimensional context of a particular gas bubble in an image of a thin film culture device is to divide the image of the growth are of the culture device into a plurality of subdivisions, each subdivision having a uniform, predetermined size and shape and to count the number of gas bubbles in each subdivision. This can be done, for example, by masking techniques that are known in the art of image analysis. FIGS. 10B-10D show the image of FIG. 10A with denoted areas (areas A1, A2, and A3, respectively) enclosed by a mask or frame of a uniform size and shape. It can be observed that area A1, which does not encompass any microbial colonies, comprises approximately thirty-four relatively small, substantially uniformly-distributed abiogenic gas bubbles. In contrast, area A2 (FIG. 10C), which encompasses at least two microbial colonies, comprises a total of approximately seven gas bubbles that are not substantially uniformly-distributed in area A2. In addition, area A3 (FIG. 10D), which encompasses one microbial colony, comprises a total of about twenty-five relatively small, substantially uniformly-distributed abiogenic gas bubbles.

According to a method of the present disclosure, analyzing an image of a thin film culture device can comprise analyzing a plurality of areas to detect the number of gas bubbles present in the area. In any embodiment, two or more of the areas can overlap. In an embodiment, the mask used to analyze each area can be rastered across the image line by line to observe differences between neighboring areas and, thereby identify particular areas of interest (within the image) that might include a microbial colony. The areas of interest (e.g., regions 101, 102, and 103 of FIG. 10A) can be identified by the lower number of gas bubbles in the area of interest relative to other areas (e.g., similar-sized areas) within the image.

According to a method of the present disclosure, analyzing the image further can comprise identifying a suspect region (e.g., one or more of the aforementioned areas of interest) of the image, wherein the suspect region has a substantially reduced number of gas bubbles relative to another portion of the image. In these instances, a presence of a gas bubble in a portion of the suspect region (e.g., a central portion of the suspect region) may indicate the presence of a biogenic gas bubble associated with microbial activity. When this circumstance is detected, the size of the gas bubble detected in the suspect region may confirm that the gas bubble in the suspect region is a biogenic gas bubble. If the size of the gas bubble in the suspect region is larger than abiogenic gas bubbles detected in other regions of the image, this is strongly indicative the gas bubble is biogenic. Regardless of its size, a gas bubble proximate a microbial colony that is located in a suspect region (i.e., a region of the image with significantly fewer gas bubbles that other regions of the culture medium in the image) may be a biogenic biogenic gas bubble and the culture device may be reported as positive for gas-producing microorganisms. Alternatively or additionally, the image may be flagged for review by an operator.

The use of a scanning system and/or image-analyzing system with a counting rule for differentiating gas bubbles and/or microbial colonies in an image of a thin film culture device has been described. The counting rule can be used in a scanning system to improve the accuracy of automated counts of microbial colonies on a culture device.

The aforementioned techniques for analyzing an image of a thin film culture device can be used in methods for detecting a presence or an absence of a microorganism in a sample inoculated into the thin film culture device. In one aspect, the method comprises analyzing an image of the growth area of a thin film culture device to detect gas bubbles and classifying a plurality of the gas bubbles, wherein classifying the plurality of gas bubbles comprises assigning each gas bubble to a first group or a second group according to a size parameter associated with each of the plurality of gas bubbles. The image of the growth area can be analyzed to detect the gas bubbles as described herein. The bubbles can be classified according to a size parameter and an upper size limit and/or lower size limit for each group can be assigned as disclosed herein. In any embodiment, classifying the gas bubbles into a first group and a second group can comprise classifying a first subset of gas bubbles into a first suspect abiogenic bubble group. In these embodiments, the method further comprises assigning a size parameter value upper limit for the first suspect abiogenic bubble group, as described herein. In any embodiment, classifying the gas bubbles into a first group and a second group can comprise classifying a second subset of gas bubbles into a suspect biogenic bubble group. In these embodiments, the method further comprises assigning a size parameter value lower limit for the suspect biogenic bubble group, as described herein.

In another aspect, the method comprises analyzing a first area of an image of a growth area of a thin film culture device to detect a first number of gas bubbles in the first area, analyzing a second area of the image to detect a second number of gas bubbles in the second area, and comparing the first number of gas bubbles to the second number of gas bubbles. Analyzing the first and second areas can comprise using an image mask to count the number of gas bubbles within the first and second areas, wherein the image mask defines a specified magnitude and shape of the area, as described herein. In any embodiment, the method further can comprise analyzing a third area of the image to detect a third number of gas bubbles in the third area, and comparing the first number of gas bubbles or second number of gas bubbles to the third number of gas bubbles. The first area, second area, and/or third area can be spaced apart from each other or at least two of the areas may partially overlap.

In yet another aspect two or more of the methods described herein may be combined into a single method to detect a presence or an absence of a microorganism in a thin film culture device. For example, the method can comprise analyzing a first area of an image of a growth area of a thin film culture device to detect a first number of gas bubbles in the first area, analyzing a second area of the image to detect a second number of gas bubbles in the second area, comparing the first number of gas bubbles to the second number of gas bubbles, analyzing the image to detect gas bubbles in the growth area of the culture device, and classifying a plurality of the gas bubbles, wherein classifying the plurality of gas bubbles comprises assigning each gas bubble to a first group or a second group according to a size parameter associated with each of the plurality of gas bubbles. In some embodiments, the method further can comprise determining whether a gas bubble in any of the first, second, or third areas is assigned to the first group or the second group. Advantageously, in this embodiment, the size of a particular gas bubble is analyzed in a context that accounts for the number and size of gas bubbles in its proximity, thereby using two separate criteria to confirm whether the particular gas bubble is biogenic or abiogenic.

The techniques have been described as being software-implemented. In that case, a computer readable medium stores processor executable instructions that embody one or more of the rules described above. For example, the computer readable medium may comprise non-transitory computer readable media such as random access memory (RAM), read-only memory (ROM), non-volatile random access memory (NVRAM), electrically erasable programmable read-only memory (EEPROM), flash memory, or the like. The computer readable medium may also comprise a non-volatile memory such as a CD-ROM used to deliver the software to customers. Also, the computer readable medium may comprise an electromagnetic carrier wave, e.g., for delivering the software over a network such as the internet.

The same techniques, however, may also be implemented in hardware. Example hardware implementations include implementations within an application specific integrated circuit (ASIC), a field programmable gate array (FPGA), specifically designed hardware components, or any combination thereof. In addition, one or more of the techniques described herein may be partially executed in hardware, software or firmware.

Thus, the present disclosure provides a computer readable medium containing computer readable instructions for detecting a presence or an absence of a microorganism in a thin film culture device. In one aspect, the computer readable instructions, when executed by a processor cause an image-analyzing system comprising the processor to analyze a first image of a thin film culture device, the culture device having a front side and a back side opposite the front side; wherein the first image is produced while providing illumination to the front side of the device as described herein. Analyzing the first image comprises identifying a microorganism colony at a first location in the culture device. The computer readable instructions, when executed by the processor, further cause the processor to analyze a second image of the thin film culture device; wherein the second image is produced while providing illumination to the back side of the device. Analyzing the second image comprises identifying a gas bubble at a second location in the culture device, as described herein. The computer readable instructions, when executed by the processor, further cause the processor to determine whether the first location is within a predetermined distance from the second location.

In another aspect, the computer readable instructions, when executed by a processor cause an image-analyzing system comprising the processor to analyze an image of the growth area of a thin film culture device to detect gas bubbles and to classify a plurality of the gas bubbles. Classifying the plurality of gas bubbles comprises assigning each gas bubble to a first group or a second group according to a size parameter associated with each of the plurality of gas bubbles, as described herein. In any embodiment, classifying the gas bubbles into a first group and a second group can comprise classifying a first subset of gas bubbles into a first suspect abiogenic bubble group, wherein the computer readable instructions further cause the processor to assign a size parameter value upper limit for the first suspect abiogenic bubble group. In any embodiment, classifying the gas bubbles into a first group and a second group can comprise classifying a second subset of gas bubbles into a suspect biogenic bubble group, wherein the computer readable instructions further cause the processor to assign a size parameter value lower limit for the suspect biogenic bubble group.

In another aspect, computer readable instructions, when executed by a processor cause an image-analyzing system comprising the processor to analyze a first area of an image of a growth area of a thin film culture device to detect a first number of gas bubbles in the first area, to analyze a second area of the image to detect a second number of gas bubbles in the second area, and to compare the first number of gas bubbles to the second number of gas bubbles. In any embodiment, the computer readable instructions further cause the processor to analyze a third area of the image to detect a third number of gas bubbles in the third area and to compare the first number of gas bubbles or second number of gas bubbles to the third number of gas bubbles. In any embodiment, the computer readable instructions further cause the processor to analyze the image to detect gas bubbles in the growth area of the culture device and to classify a plurality of the gas bubbles, wherein classifying the plurality of gas bubbles comprises assigning each gas bubble to a first group or a second group according to a size parameter associated with each of the plurality of gas bubbles, as described herein. In some embodiments, the computer readable instructions further cause the processor to determine whether a gas bubble in any of the first, second, or third areas is assigned to the first group or the second group.

In any embodiment, a computer readable medium comprising computer readable instructions may comprise instructions that include two or more of the methods described herein. The two or more methods can be used individually, or in combination, to improve the accuracy of the detection of a gas-producing microbial colony.

EMBODIMENTS

Embodiment A is a method, comprising:
using an imaging device to produce a first image of a thin film culture device, the culture device having a front side having a transparent film cover sheet and a back side having a translucent substrate;
wherein the first image is produced while providing illumination to the front side of the device;
wherein the culture device comprises an indicator compound that is converted by a microorganism to a first product that is observable by a first color;
wherein the culture device comprises a nutrient that can be converted to by a first type of microorganism to a gas;
using the imaging device to produce a second image of the thin film culture device, wherein the second image is produced while providing illumination to the back side of the device;
analyzing the first image to identify a microorganism colony at a first location in the culture device;
analyzing the second image to identify a first gas bubble at a second location in the culture device; and
determining whether the first location is within a predetermined distance from the second location.

Embodiment B is the method of Embodiment A, wherein the first image is produced while illuminating the device with a first ratio of front-side illumination to back-side illumination, wherein the second image is produced while illuminating the device with a second ratio of front-side illumination to back-side illumination that is lower than the first ratio.

Embodiment C is the method of Embodiment B, wherein the first ratio is about 100%:0%.

Embodiment D is the method of Embodiment B or Embodiment C, wherein the second ratio is about 0%:100%.

Embodiment E is the method of any one of the preceding Embodiments, wherein the first gas bubble comprises a first perimeter, wherein analyzing the second image to identify a first gas bubble comprises identifying a dark annulus associated with the first perimeter.

Embodiment F is the method of any one of the preceding Embodiments, wherein analyzing the second image to identify a first gas bubble comprises calculating a size parameter of the first gas bubble.

Embodiment G is the method of Embodiment F, wherein the size parameter is a radius, a diameter, or an area.

Embodiment H is the method of any one of the preceding Embodiments, wherein analyzing the second image to identify a first gas bubble comprises analyzing a first predetermined region surrounding the first gas bubble to detect a second gas bubble.

Embodiment I is the method of Embodiment H, wherein the first predetermined region comprises a microbial colony, wherein the method further comprises comparing a number of gas bubbles in the first predetermined region to a number of gas bubbles in a second predetermined region, wherein the second predetermined region does not comprise a microbial colony.

Embodiment J is the method of any one of Embodiments F through I, further comprising comparing the size parameter of the first gas bubble to the size parameter of a second gas bubble.

Embodiment K is the method of any one of the preceding Embodiments, further comprising using the first image to count a number of microorganism colonies in the culture device.

Embodiment L is the method of Embodiment K, further comprising using the first and second images to count a number of microorganism colonies that convert the nutrient to a gas.

Embodiment M is the method of any one of the preceding Embodiments, further comprising using the first and second images to count a number of microorganism colonies that don't convert the nutrient to a gas.

Embodiment N is the method of any one of the preceding Embodiments, wherein the indicator compound comprises a tetrazolium dye.

Embodiment O is the method of any one of the preceding Embodiments, wherein the nutrient comprises a carbohydrate.

Embodiment P is the method of Embodiment O, wherein the carbohydrate is selected from the group consisting of glucose, sucrose, lactose, or a combination of any two or more of the foregoing carbohydrates.

Embodiment Q is a computer readable medium comprising computer readable instructions that, when executed by a processor, cause an image-analyzing system comprising the processor to:
analyze a first image of a thin film culture device, the culture device having a front side and a back side opposite the front side;
wherein the first image is produced while providing illumination to the front side of the device;

wherein analyzing the first image comprises identifying a microorganism colony at a first location in the culture device; analyze a second image of the thin film culture device;

wherein the second image is produced while providing illumination to the back side of the device;

wherein analyzing the second image comprises identifying a gas bubble at a second location in the culture device; and determine whether the first location is within a predetermined distance from the second location.

Embodiment R is the computer readable medium of Embodiment Q, wherein analyzing the second image to identify a second location of a gas bubble comprises identifying a dark annulus surrounding the gas bubble.

Embodiment S is the computer readable medium of Embodiment Q or Embodiment R, further comprising computer readable instructions that, when executed in the processor, cause the system to use the first image to count a number of microorganism colonies in the culture device.

Embodiment T is the computer readable medium of Embodiment Q or Embodiment R, further comprising computer readable instructions that, when executed in the processor, cause the system to use the first and second images to count a number of gas-producing microorganism colonies in the culture device.

Embodiment U is a method, comprising:
analyzing an image of the growth area of a thin film culture device to detect gas bubbles; and
classifying a plurality of the gas bubbles, wherein classifying the plurality of gas bubbles comprises assigning each gas bubble to a first group or a second group according to a size parameter associated with each of the plurality of gas bubbles.

Embodiment V is the method of Embodiment T, wherein classifying the gas bubbles into a first group and a second group comprises classifying a first subset of gas bubbles into a first suspect abiogenic bubble group, wherein the method further comprises assigning a size parameter value upper limit for the first suspect abiogenic bubble group.

Embodiment W is the method of Embodiment U or Embodiment V, wherein classifying the gas bubbles into a first group and a second group comprises classifying a second subset of gas bubbles into a suspect biogenic bubble group, wherein the method further comprises assigning a size parameter value lower limit for the suspect biogenic bubble group.

Embodiment X is the method of Embodiment W, wherein the size parameter value lower limit for the suspect biogenic bubble group is at least about two times larger than the size parameter value upper limit for the first suspect abiogenic bubble group.

Embodiment Y is a computer readable medium comprising computer readable instructions that, when executed by a processor, cause an image-analyzing system comprising the processor to:
analyze an image of the growth area of a thin film culture device to detect gas bubbles; and
classify a plurality of the gas bubbles, wherein classifying the plurality of gas bubbles comprises assigning each gas bubble to a first group or a second group according to a size parameter associated with each of the plurality of gas bubbles.

Embodiment Z is the computer readable medium of Embodiment Y, wherein classifying the gas bubbles into a first group and a second group comprises classifying a first subset of gas bubbles into a first suspect abiogenic bubble group, wherein the computer readable instructions further cause the processor to assign a size parameter value upper limit for the first suspect abiogenic bubble group.

Embodiment AA is the computer readable medium of Embodiment Y or Embodiment Z, wherein classifying the gas bubbles into a first group and a second group comprises classifying a second subset of gas bubbles into a suspect biogenic bubble group, wherein the computer readable instructions further cause the processor to assign a size parameter value lower limit for the suspect biogenic bubble group.

Embodiment BB is a method, comprising:
analyzing a first area of an image of a growth area of a thin film culture device to detect a first number of gas bubbles in the first area;
analyzing a second area of the image to detect a second number of gas bubbles in the second area; and
comparing the first number of gas bubbles to the second number of gas bubbles.

Embodiment CC is the method of Embodiment BB, further comprising:
analyzing a third area of the image to detect a third number of gas bubbles in the third area; and
comparing the first number of gas bubbles or second number of gas bubbles to the third number of gas bubbles.

Embodiment DD is the method of Embodiment BB or Embodiment CC, further comprising:
analyzing the image to detect gas bubbles in the growth area of the culture device; and
classifying a plurality of the gas bubbles, wherein classifying the plurality of gas bubbles comprises assigning each gas bubble to a first group or a second group according to a size parameter associated with each of the plurality of gas bubbles.

Embodiment EE is the method of Embodiment DD, further comprising:
determining whether a gas bubble in any of the first, second, or third areas is assigned to the first group or the second group.

Embodiment FF is a computer readable medium comprising computer readable instructions that, when executed by a processor, cause an image-analyzing system comprising the processor to:
analyze a first area of an image of a growth area of a thin film culture device to detect a first number of gas bubbles in the first area;
analyze a second area of the image to detect a second number of gas bubbles in the second area; and
compare the first number of gas bubbles to the second number of gas bubbles.

Embodiment GG is the computer readable medium of Embodiment FF, wherein the computer readable instructions further cause the processor to:
analyze a third area of the image to detect a third number of gas bubbles in the third area; and
compare the first number of gas bubbles or second number of gas bubbles to the third number of gas bubbles.

Embodiment HH is the computer readable medium of Embodiment FF or Embodiment GG, wherein the computer readable instructions further cause the processor to:
analyze the image to detect gas bubbles in the growth area of the culture device; and
classify a plurality of the gas bubbles, wherein classifying the plurality of gas bubbles comprises assigning each gas bubble to a first group or a second group according to a size parameter associated with each of the plurality of gas bubbles.

Embodiment II is the computer readable medium of Embodiment HH, wherein the computer readable instructions further cause the processor to determine whether a gas bubble in any of the first, second, or third areas is assigned to the first group or the second group.

EXAMPLES

Example 1

Method for Detecting Gas-Producing Colonies

Tryptic Soy Broth (TSB, Catalog # K89) was obtained from Hardy Diagnostics (Santa Maria, Calif.). Microbial strains *E. coli* (ATCC 25922), *E. coli* (3M-FR4), *Salmonella enterica* (ATCC 51812) and *Enterobacter amnigenus* (ATCC 51898) were obtained from Microbiologics Inc (St Cloud, Minn.). An overnight TSB culture was prepared for each microbial strain. Thin film culture devices (3M PETRIFILM *E. Coli*/Coliform Count (EC) Plates) and Butterfield's Phosphate Buffer were both obtained from the 3M Company (St. Paul, Minn.).

Dilutions from overnight cultures of each strain were prepared in Butterfield's Phosphate Buffer to yield approximately 25 colony-forming units (CFU) per mL. The 3M PETRIFILM plates were inoculated by lifting the transparent film cover sheet, pipetting 1 mL of the diluted sample in the center of the coated bottom film, and replacing the cover sheet. The sample was uniformly spread to the desired surface area (approximately 20 cm$^2$) using the spreading device provided by the manufacturer (3M). Inoculated plates were incubated at 35° C. for 24 hours.

The colonies on the PETRIFILM culture plate were imaged and identified using a culture device imaging system. The imaging system contained a centrally positioned glass platen (White Flashed Opal Glass) that served as a platform for placement of the culture plate. The culture plate was illuminated using two separate sets of light emitting diodes (each set containing two red LEDs, two green LEDs, and two blue LEDs) One set was positioned above to the left (relative to the longitudinal dimension) of the culture plate and the other set was positioned above and to the right (relative to the longitudinal dimension of the culture plate). Light from the LEDs positioned above the culture device was directed away from the culture device and into a light-diffusing reflective surface, which directed a substantially uniform illumination pattern on the front side of the culture plate. Similarly, the culture plate was illuminated on the back side using two separate sets of light emitting diodes (each set containing two red LEDs, two green LEDs, and two blue LEDs). One set was positioned below and to the left (relative to the longitudinal dimension) of the culture plate and the other set was positioned below and to the right (relative to the longitudinal dimension of the culture plate). Light from the LEDs positioned below the culture device was directed away from the culture device and into a light-diffusing reflective surface, which directed a substantially uniform illumination pattern onto the back side of the glass platen (described above) and created a uniform illumination pattern on the back side of the culture plate.

An Aptina Model MT9P031 CMOS imaging sensor (Aptina Imaging, San Jose, Calif.) was orthogonally-positioned above the platform and positioned to take images of the culture plate. The imaging sensor and platform were adjusted so that the culture plate was positioned within the focal plane of the sensor. The culture plate was oriented on the platform so that front side (transparent film side) of the culture plate faced the imaging sensor. A black cover was used to isolate the imaging device from room light. The image exposures were selected so that, in the acquired images, less than about 10% of the pixels in a histogram of all of the image pixels were saturated. A first image was taken using only illumination from the front side of the culture plate and a second image was taken using only illumination from the back side of the culture plate. Both images were taken with the culture plate being maintained in exactly the same position on the platform (i.e., the plates were not moved from the platform until both images were acquired). This allowed for the identification of coincidental colonies in the two images by matching the corresponding X-Y coordinate positions.

The two images were analyzed using ImagePro Plus software (Media Cybernetics, Rockville, Md.). The size of an individual colony was determined from the first culture plate image (100% front-side illumination). The imaging program analyzed for changes in red, green, and blue pixel intensities observed along a line of pixels incorporating the longest dimension of the suspect colony's image. The pixel positions that defined a change in intensity relative to the local background were used to mark the margins of the colony image and to measure the colony diameter (diameter distance was reported as the number of pixels located between the pixel points marking the colony margins).

The diameter of a gas bubble was determined using the second culture plate image (100% back-side illumination). The imaging program analyzed for changes in pixel color intensity observed along a line of pixels incorporating the longest dimension of the bubble image. RGB (red/green/blue) image processing techniques were used, with the green channel providing the greatest contrast to identify gas bubbles in the particular growth medium used in this culture device. The pixel positions where a sharp decrease in pixel color intensity relative to the local background color intensity occurred were identified and marked as the positions defining the dark annulus at the perimeter of the bubble. The diameter of the bubble was measured by counting the number of pixels between the two identified pixel positions.

In the next step, the imaging program compared both the size and proximity of the gas bubble image (obtained from the second culture plate image) to the size and position of the nearest colony image (obtained from the first culture plate image) and the bubble size and proximity criteria described above were applied. According to the criteria, it can be concluded that gas bubbles 81, 82, and 83 in FIG. 6 are all associated with colony 71 and, in addition, at least gas bubble 81 is associated with colony 73. It can be concluded further that there are no biogenic gas bubbles associated with colony 72 in FIG. 6.

In any case, various modifications may be made without departing from the spirit and scope of the invention. For example, one or more of the rules described herein may be used with or without other rules and various subsets of the rules may be applied in any order, depending on the desired implementation. These and other embodiments are within the scope of the following claims.

The invention claimed is:
1. A method, comprising:
analyzing an image of the growth area of a thin film culture device to detect gas bubbles; and
classifying a plurality of the gas bubbles, wherein classifying the plurality of gas bubbles comprises assigning each gas bubble to a first group or a second group according to a size parameter associated with each of the plurality of gas bubbles.

2. The method of claim 1, wherein classifying the gas bubbles into a first group and a second group comprises classifying a first subset of gas bubbles into a first suspect abiogenic bubble group, wherein the method further comprises assigning a size parameter value upper limit for the first suspect abiogenic bubble group.

3. The method of claim 1, wherein classifying the gas bubbles into a first group and a second group comprises classifying a second subset of gas bubbles into a suspect biogenic bubble group, wherein the method further comprises assigning a size parameter value lower limit for the suspect biogenic bubble group.

4. The method of claim 1, wherein the thin-film culture medium contains an indicator compound.

5. The method of claim 1, wherein the thin-film culture medium contains two or more indicator compounds.

6. The method of claim 1, wherein the thin-film culture medium contains two or more indicator compounds.

7. A non-transitory computer readable medium comprising computer readable instructions that, when executed by a processor, cause an image-analyzing system comprising the processor to:
   analyze an image of the growth area of a thin film culture device to detect gas bubbles; and
   classify a plurality of the gas bubbles, wherein classifying the plurality of gas bubbles comprises assigning each gas bubble to a first group or a second group according to a size parameter associated with each of the plurality of gas bubbles.

8. The non-transitory computer readable medium of claim 7, wherein classifying the gas bubbles into a first group and a second group comprises classifying a first subset of gas bubbles into a first suspect abiogenic bubble group, wherein the method further comprises assigning a size parameter value upper limit for the first suspect abiogenic bubble group.

9. The non-transitory computer readable medium of claim 7, wherein classifying the gas bubbles into a first group and a second group comprises classifying a second subset of gas bubbles into a suspect biogenic bubble group, wherein the method further comprises assigning a size parameter value lower limit for the suspect biogenic bubble group.

10. A method, comprising:
    analyzing a first area of an image of a growth area of a thin film culture device to detect a first number of gas bubbles in the first area;
    analyzing a second area of the image to detect a second number of gas bubbles in the second area;
    comparing the first number of gas bubbles to the second number of gas bubbles;
    analyzing the image to detect gas bubbles in the growth area of the culture device; and
    classifying a plurality of the gas bubbles, wherein classifying the plurality of gas bubbles comprises assigning each gas bubble to a first group or a second group according to a size parameter associated with each of the plurality of gas bubbles.

11. The method of claim 10, further comprising:
    analyzing a third area of the image to detect a third number of gas bubbles in the third area; and
    comparing the first number of gas bubbles or second number of gas bubbles to the third number of gas bubbles.

12. The method of claim 10, further comprising:
    determining whether a gas bubble in any of the first, second, or third areas is assigned to the first group or the second group.

13. The method of claim 10, wherein the thin-film culture medium contains an indicator compound.

14. A non-transitory computer readable medium comprising computer readable instructions that, when executed by a processor, cause an image-analyzing system comprising the processor to:
    analyze a first area of an image of a growth area of a thin film culture device to detect a first number of gas bubbles in the first area;
    analyze a second area of the image to detect a second number of gas bubbles in the second area; and
    compare the first number of gas bubbles to the second number of gas bubbles;
    analyze the image to detect gas bubbles in the growth area of the culture device; and
    classifying a plurality of the gas bubbles, wherein classifying the plurality of gas bubbles comprises assigning each gas bubble to a first group or a second group according to a size parameter associated with each of the plurality of gas bubbles.

15. The non-transitory computer readable medium of claim 14, wherein the computer readable instructions, when executed by a processor, the processor to further:
    analyze a third area of the image to detect a third number of gas bubbles in the third area; and
    comparing the first number of gas bubbles or second number of gas bubbles to the third number of gas bubbles.

* * * * *